(12) United States Patent
Miyazaki et al.

(10) Patent No.: US 10,591,133 B2
(45) Date of Patent: Mar. 17, 2020

(54) DIFFRACTIVE OPTICAL ELEMENT AND LIGHT IRRADIATION APPARATUS

(71) Applicant: DAI NIPPON PRINTING CO., LTD., Tokyo-to (JP)

(72) Inventors: Yuichi Miyazaki, Tokyo (JP); Nobuhito Toyama, Tokyo (JP); Hidenori Yoshioka, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 16/524,986

(22) Filed: Jul. 29, 2019

(65) Prior Publication Data

US 2019/0346108 A1    Nov. 14, 2019

Related U.S. Application Data

(63) Continuation of application No. 16/068,019, filed as application No. PCT/JP2016/089132 on Dec. 28, 2016.

(30) Foreign Application Priority Data

Jan. 8, 2016   (JP) ................................ 2016-002984
Aug. 29, 2016  (JP) ................................ 2016-166576

(51) Int. Cl.
*F21V 5/02*     (2006.01)
*G02B 5/18*     (2006.01)
(Continued)

(52) U.S. Cl.
CPC .................. *F21V 5/02* (2013.01); *G02B 5/18* (2013.01); *G02B 27/4222* (2013.01); *F21Y 2115/10* (2016.08)

(58) Field of Classification Search
CPC ... F21V 5/02; F21V 9/08; F21V 9/083; F21V 9/40; F21V 9/45; G02B 27/4222; G02B 5/18; F21Y 2115/10
See application file for complete search history.

(56) References Cited

U.S. PATENT DOCUMENTS 6,762,880 B2 ‡   7/2004   Holm .................... G02B 5/1847
                                                      359/56
9,400,346 B2 ‡   7/2016   Kim ...................... G02B 5/3058
(Continued)

FOREIGN PATENT DOCUMENTS

JP    2005-084561 A  ‡  3/2005
JP    2005-084561 A     3/2005
(Continued)

OTHER PUBLICATIONS

Lee et al; "Pattern-Transfer Fidelity in Soft Lithography: The Role of Pattern Density and Aspect Ratio**;" Advanced Functional Materials; vol. 15, No. 1; pp. 1683-1688; Sep. 1, 2005.‡

(Continued)

*Primary Examiner* — Joseph L Williams
*Assistant Examiner* — Jose M Diaz
(74) *Attorney, Agent, or Firm* — Oliff PLC

(57) ABSTRACT

A diffractive optical element is configured to provide desired diffracted light and is excellent in durability. The diffractive optical element shapes light from a light source, wherein the diffractive optical element is provided with a diffractive layer having a periodic structure having low refractive index portions and high refractive index portions, and the high refractive index portions of the periodic structure include one having an aspect ratio of 2 or more.

11 Claims, 11 Drawing Sheets

(51) Int. Cl.
*G02B 27/42* (2006.01)
*F21Y 115/10* (2016.01)

(56) References Cited

U.S. PATENT DOCUMENTS

| | | | | |
|---|---|---|---|---|
| 9,696,589 | B2 ‡ | 7/2017 | Chung | G02B 5/3058 |
| 2009/0109377 | A1 ‡ | 4/2009 | Sawaki | G02B 5/1814 |
| | | | | 349/96 |
| 2010/0182692 | A1 ‡ | 7/2010 | Kenmochi | G02B 5/1861 |
| | | | | 359/485.05 |
| 2013/0182327 | A1 ‡ | 7/2013 | Miyasaka | G01B 11/25 |
| | | | | 359/57 |
| 2014/0126060 | A1 ‡ | 5/2014 | Seki | G02B 5/1809 |
| | | | | 359/56 |
| 2014/0300835 | A1 | 10/2014 | Chu et al. | |
| 2015/0252980 | A1 ‡ | 9/2015 | Maeda | G06K 9/00013 |
| | | | | 382/11 |
| 2016/0294159 | A1 ‡ | 10/2016 | Hashimoto | H01S 5/3402 |
| 2018/0351328 | A1 ‡ | 12/2018 | Kiyota | H01S 5/12 |

FOREIGN PATENT DOCUMENTS

| | | | | | |
|---|---|---|---|---|---|
| JP | 2010-210824 | A | ‡ | 9/2010 | |
| JP | 2010-210824 | A | | 9/2010 | |
| JP | 2014-071233 | A | ‡ | 4/2014 | |
| JP | 2014-071233 | A | | 4/2014 | |
| JP | 2014-092730 | A | ‡ | 5/2014 | |
| JP | 2014-092730 | A | | 5/2014 | |
| JP | 2014-123082 | A | ‡ | 7/2014 | |
| JP | 2014-123082 | A | | 7/2014 | |
| JP | 2015-170320 | A | ‡ | 9/2015 | |
| JP | 2015-170320 | A | | 9/2015 | |
| WO | 2012/167076 | A2 | | 12/2012 | |
| WO | WO-2012/167076 | A2 | ‡ | 12/2012 | G03F 7/0002 |

OTHER PUBLICATIONS

Lee et al; "Pattern-Transfer Fidelity in Soft Lithography: The Role of Pattern Density and Aspect Ratio**;" Advanced Functional Materials; vol. 15; No. 10; pp. 1683-1688; Sep. 1, 2005.‡
Apr. 4, 2017 International Search Report issued in International Patent Application No. PCT/JP2016/089132.‡
Lee et al; "Pattern-Transfer Fidelity in Soft Lithography: The Role of Pattern Density and Aspect Ratio**;" Advanced Functional Materials; vol. 15; pp. 1683-1688; 2005.
May 15, 2019 Notice of Allowance and Fee(s) Due issued in U.S. Appl. No. 16/068,019.
Nov. 12, 2019 U.S. Office Action issued U.S. Appl. No. 16/068,019.

‡ imported from a related application (a)                    (c)

DIFFRACTIVE OPTICAL ELEMENT AND LIGHT IRRADIATION APPARATUS

CROSS-REFERENCE TO RELATED APPLICATIONS

This is a continuation of application Ser. No. 16/068,019 filed Jul. 3, 2018, which in turn is a National Stage Application of PCT/JP2016/089132 filed on Dec. 28, 2016, which claims the benefit of Japanese Patent Application No. JP 2016-166576 filed Aug. 29, 2016 and JP 2016-002984 filed on Jan. 8, 2016. The disclosure of the prior application[s] is hereby incorporated by reference herein in its entirety.

TECHNICAL FIELD

The disclosure relates to a diffractive optical element and a light irradiation apparatus.

BACKGROUND ART

In recent years, there are many situations that require sensor systems such as a need for, due to the spread of networks, personal authentication to avoid security risks, automatic operation of vehicles, and the spread of a so-called "internet of things" (IOT). There are many kinds of sensors and a variety of information detected thereby. One of them is a method for obtaining information by irradiating a target with light from a light source and receiving information from reflected light. For example, a pattern recognition sensor and an infrared radar are provided.

As the light source of the sensors, light having features tailored to the intended application, which are wavelength distribution, luminance and profile, is used. As the wavelength of the light, visible light to infrared light are used often. Especially, infrared light is widely used since it is characterized by being resistant to the influence of outside light, being invisible, and making it possible to observe the slight inside of a target. For the type of the light source, a LED light source and a laser light source are used often. For example, to detect a distant place, a laser light source is preferably used, which is small in light spread. To detect a relatively near place or irradiate a relatively wide region, an LED light source is preferably used.

The size and shape of a target irradiation region is not always consistent with the spread (profile) of light from a light source. In this case, it is necessary to regulate the shape of the light by a diffuser plate, lens, shield plate, etc. Recently, a so-called light shaping diffuser (LSD) was developed, which is a diffuser plate that can shape the shape of light to some extent.

As another light shaping method, a diffractive optical element (DOE) is provided, which utilizes a diffraction phenomenon that is observed when light passes through an area where materials with different refractive indices are periodically arranged. The DOE is basically designed with respect to a single wavelength of light and, in theory, it can shape light in an almost desired shape. With the above-mentioned LSD, the intensity of light in an irradiation region has a Gaussian distribution. Meanwhile, the DOE can control the uniformity of light distribution in an irradiation region. Such a characteristic of the DOE is advantageous in increasing efficiency by reducing light irradiation to an unnecessary region, and in downsizing a device by, for example, decreasing the number of light sources (for example, see Patent Document 1, etc.)

The DOE is applicable to both a directional light source such as laser and a diffused light source such as LED. The DOE is also applicable to a wide range of wavelengths including ultraviolet light, visible light and infrared light.

The DOE needs nanometer-scale microfabrication. Especially, to diffract a long wavelength of light, it is needed to form a high-aspect-ratio fine shape. Therefore, an electron beam lithography technique using an electron beam, has been used for the production of the DOE. For example, a desired DOE can be obtained as follows: a hard mask and a resist film are formed on a quartz plate, which is transparent in ultraviolet to infrared ranges; a predetermined shape is photolithographically created in the resist by using an electron beam, followed by developing the resist, dry-etching the hard mask, and then dry-etching the quartz, thereby forming a pattern on a surface of the quartz plate; then, the hard mask is removed, thereby obtaining the desired DOE.

CITATION LIST

Patent Document 1: Japanese Patent Application Laid-Open No. 2015-170320

SUMMARY OF INVENTION

Technical Problem

As describe above, in view of the wavelength of light used for sensing, infrared light is widely used since it is especially characterized by being resistant to the influence of outside light, being invisible, and besides making it possible to observe the slight inside of a target. Sunlight is a typical example of outside light that interferes with sensing. Sunlight emits very strong visible light and relatively weak infrared light. Due to the influence of water vapor in the air, the intensity of sunlight especially near the Earth's surface decreases at around a wavelength of 940 nm (a wavelength of 900 nm or more and 1000 nm or less) and at a wavelength of 1100 nm or more and 1200 nm or less. Therefore, the use of infrared light in applications such as an outdoor sensor, is advantageous from the viewpoint of sensitivity. Especially, the use of light in the above wavelength range is very advantageous. To diffract light in the above infrared wavelength range, it is needed to increase the height of convexities on the diffractive layer of the DOE (that is, it is needed to increase the aspect ratio of the convexities).

In the DOE production, the conventional electron beam lithography technique involves a complicated multiple processes as described above. Accordingly, there are such problems that small throughput (productivity per unit time) makes mass production impossible and, as a result, increases production costs.

One possibility for solving such problems may be to make a duplicate by molding (imprinting) on a resin composition using, as a mold, a DOE produced by electron beam lithography. Examples of molding means include, but are not limited to, injection molding, thermal imprinting, duplication by use of a two-component curing type resin or a soluble resin, and imprinting on an ionizing radiation curable resin such as an ultraviolet curable resin or an electron beam curable resin. The inventors of the disclosed embodiments focused on and studied molding on the ionizing radiation curable resin, from the point of view that short-time curing and large improvement in throughput can be achieved. However, in the case of molding a nanometer-scale, high-aspect-ratio fine shape, it is difficult to demold the resin after curing, and the resin forming a diffraction grating pattern may be broken or fractured. When flexibility is imparted to the resin in order to avoid this, the following problems occur: the resin is deformed at the time of demolding; the deformed parts of the resin are stuck to each other; and a DOE thus obtained is likely to be damaged.

For example, when breakage, fracture (FIG. 19) or sticking (FIG. 20) occurs in the resin forming the diffraction grating pattern, an irradiation region cannot be uniformly irradiated with light, or light may not be shaped in a desired shape.

In general, compared to silicon (Si) materials that are widely used as diffraction grating materials for infrared light, artificial quartz or a cured product of a resin composition tends to have a small refractive index. Therefore, if a resin composition is used to produce a diffractive optical element that can provide diffracted light comparable to the element made of the silicon materials, it is needed to form convexities having an aspect ratio larger than that of convexities made of the silicon materials.

Therefore, the above-mentioned fracture and sticking are serious problems in the DOE production.

An object of the disclosed embodiments is to provide a diffractive optical element being configured to provide desired diffracted light and being excellent in durability, and a light irradiation apparatus comprising the diffractive optical element and being configured to provide a desired irradiation region.

Solution to Problem

In a first embodiment, there is provided a diffractive optical element configured to shape light from a light source, wherein the diffractive optical element is provided with a diffractive layer having a periodic structure comprising low refractive index portions and high refractive index portions, and the high refractive index portions of the periodic structure include one having an aspect ratio of 2 or more.

The high refractive index portions may comprise a cured product of an ionizing radiation curable resin composition.

A storage modulus (E') at 25° C. of the cured product of the ionizing radiation curable resin composition may be $1 \times 10^8$ Pa or more and $5 \times 10^9$ Pa or less, and a ratio (tan δ (=E"/E')) of a loss modulus (E") at 25° C. of the cured product of the ionizing radiation curable resin composition with respect to the storage modulus (E') may be 0.3 or less.

For a sectional shape of the diffractive layer, convexities forming the high refractive index portions may include one having a height of 1000 nm or more.

For the sectional shape of the diffractive layer, the convexities forming the high refractive index portions may be in a stepped shape having two or more flat portions.

An aspect ratio of the convexities of the stepped shape may be 3.5 or more.

The low refractive index portions may be air.

The diffractive layer and a coating layer may be disposed in this sequence on a transparent substrate.

An antireflection layer may be disposed on an outermost surface.

The diffractive optical element may diffract infrared light with a wavelength of 780 nm or more.

In another embodiment, there is provided a light irradiation apparatus comprising a light source and at least one diffractive optical element of the first embodiment.

The light source may emit infrared light with a wavelength of 780 nm or more.

Advantageous Effects of Invention

According to the disclosed embodiments, a diffractive optical element being configured to provide desired diffracted light and being excellent in durability, and a light irradiation apparatus comprising the diffractive optical element and being configured to provide a desired irradiation region, can be obtained.

BRIEF DESCRIPTION OF DRAWINGS

In the accompanying drawings.

DESCRIPTION OF EMBODIMENTS

Hereinafter, the diffractive optical element and light irradiation apparatus of the disclosed embodiments will be described in detail.

Figure 1:
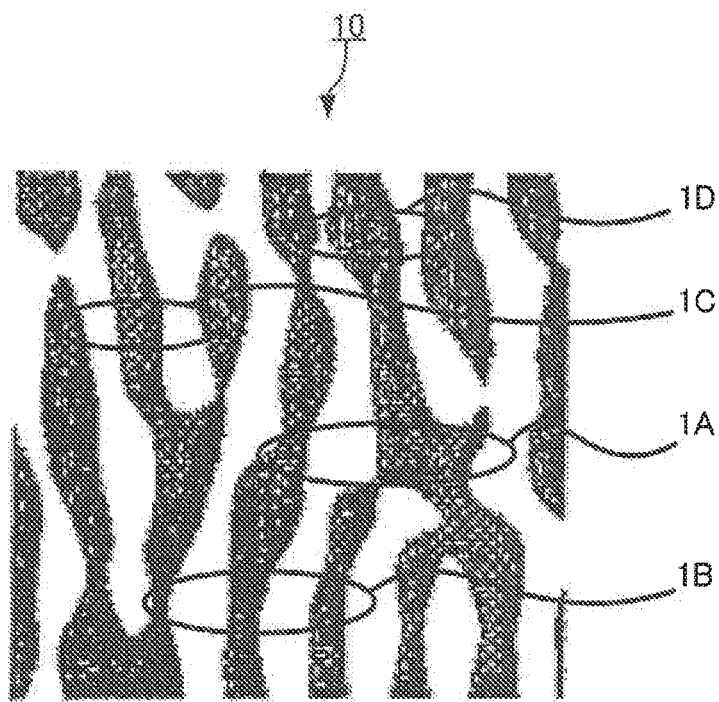
FIG. 1 is a schematic plan view of a diffractive optical element according to an embodiment.

In the disclosed embodiments, the meanings of terms and values used to determine shapes, geometric conditions, and degrees thereof (for example, terms such as "parallel", "perpendicular" and "identical" and values of length and angle) shall not be strictly restricted and shall be understood to encompass ranges such that similar functions are expected. In this Description, "plan view" means observing the upper surface of the diffractive optical element from the vertical direction. In general, it corresponds to observing a surface including a diffractive layer of the diffractive optical element from the vertical direction (corresponding to the direction of the plan view as shown in FIG. 1).

In the disclosed embodiments, ionizing radiation includes electromagnetic waves with wavelengths in the visible and non-visible ranges, and radiation. Radiation includes microwaves and electron beams. More specifically, they are electromagnetic waves with a wavelength of 5 µm or less, and electron beams.

In the disclosed embodiments, (meth)acryl encompasses acryl and methacryl; (meth)acrylate encompasses acrylate and methacrylate; and (meth)acryloyl encompasses acryloyl and methacryloyl.

Figure 12:
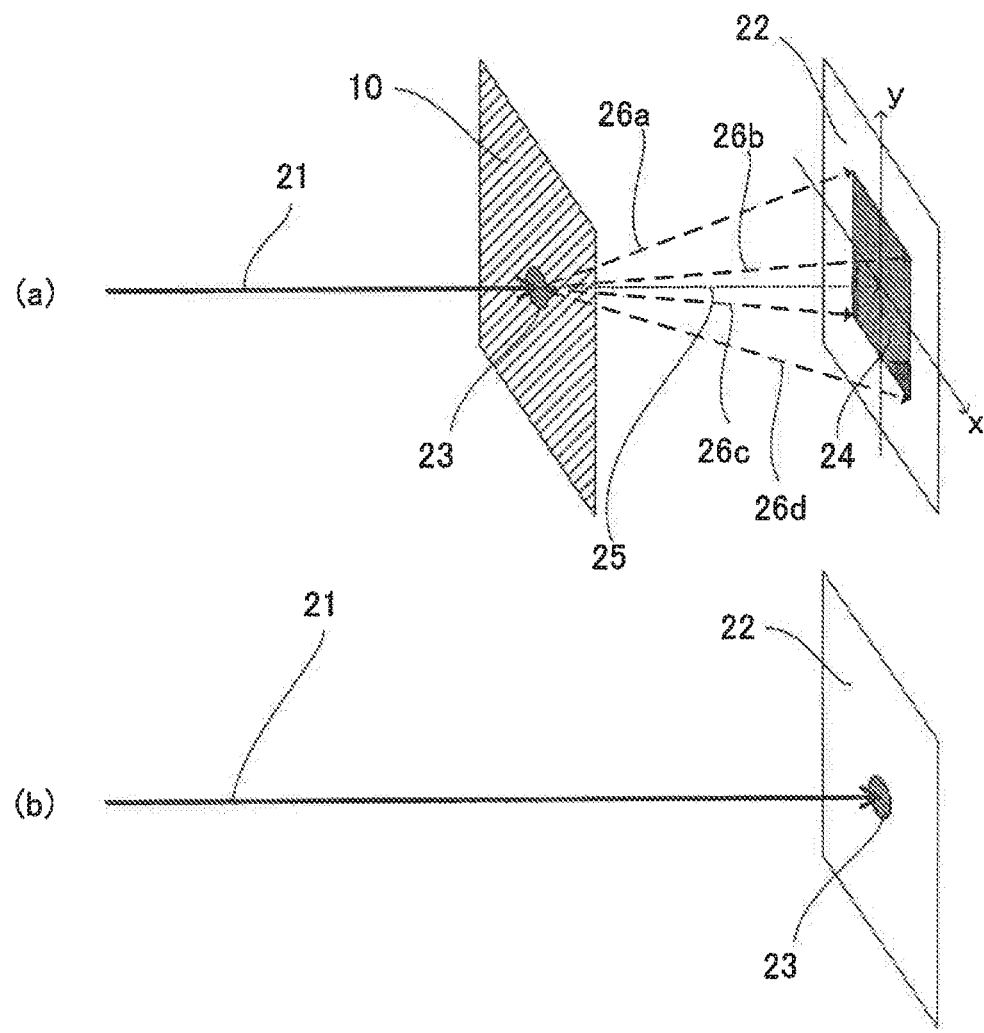
FIG. 12 is a view used for explanation of a diffractive optical element.

In the disclosed embodiments, "shape light" means to make the shape (irradiation region) of light projected onto a target or a target region into a desired shape by controlling the travelling direction of light. For example, as shown by the examples of FIG. 12, when a light shown as (b) in FIG. 12 is directly projected onto a planar screen 22, it makes an irradiation region 23 into a circle shape. However, if the same light is got passed through a diffractive optical element 10 of the disclosed embodiments, the irradiation region is made into an aimed shape such as a square shape (24 of (a) in FIG. 12), a rectangle shape and a circle shape (not shown).

In the disclosed embodiments, when light emitted from the light source and passed through the diffractive optical element without diffraction, it may be referred to as 0th-order light (25 in FIG. 12), and diffracted light produced by the diffractive optical element may be referred to as 1st-order light (26 in FIG. 12).

Figure 2:
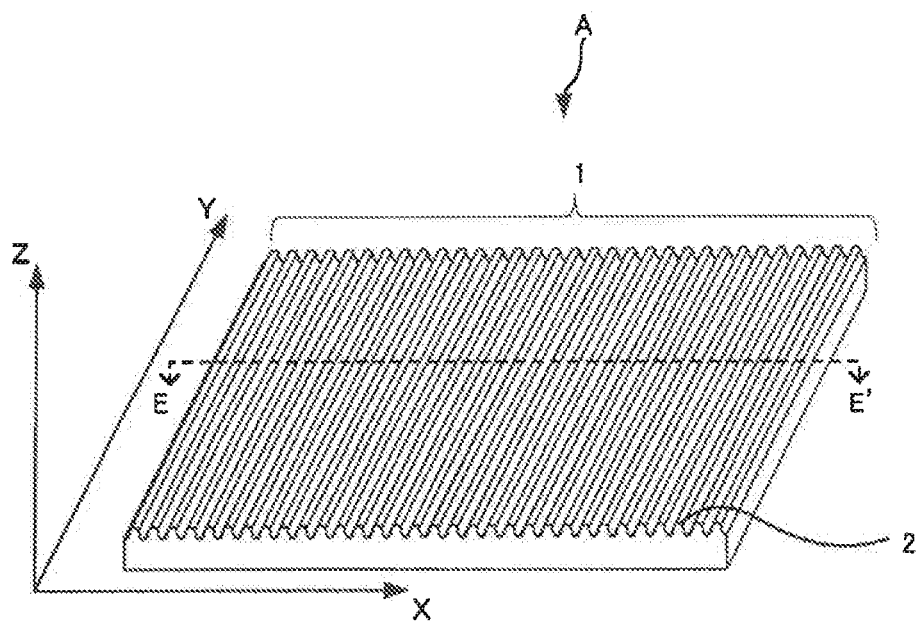
FIG. 2 is a schematic perspective view of an example of a partial periodic structure of a diffractive optical element according to an embodiment.

In the disclosed embodiments, the sectional shape of the diffractive layer is defined as one obtained when the diffractive optical element is placed on a horizontal surface. In the example of FIG. 2, the X axis is the repeating direction of a periodic structure; the Y axis is an axis that is perpendicular to the X axis so that XY forms a horizontal surface; and the Z axis is an axis that is in a direction vertical to the XY horizontal surface. In the disclosed embodiments, a valley between convexities (that is, the minimum point of Z) is referred to as height 0, and a part with a height of 0 is referred to as concavity. Also in the disclosed embodiments, a part with a height of H (H>0) is referred to as convexity. In the disclosed embodiments, when the maximum height of the convexity is decided as a base position, a distance from the maximum height of the convexity to the valley may be referred to as depth. In the disclosed embodiments, however, height and depth have a relationship like two sides of a coin. One who gives an attention to an aspect of the convexity may think of "height", while the other one who gives an attention to an aspect of the concavity may think of "depth", thus the height of the convexity is substantially the same as the depth of the concavity.

Figure 3:
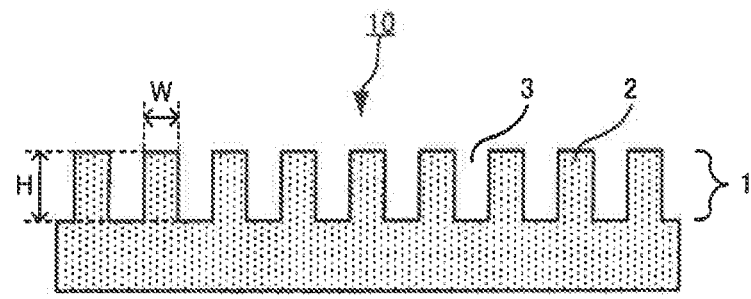
FIG. 3 is a schematic sectional view of the diffractive optical element of FIG. 2 along the line E-E'.

In the disclosed embodiments, when the sectional shape of the diffractive layer has the repeating structure composed of, as shown in FIG. 3, concavities with a height of 0 and convexities with a height of H, it may be referred to as 2-level shape. Also in the disclosed embodiments, when the convexities of the sectional shape of the diffractive layer have two or more flat portions (approximately horizontal portions), the sectional shape may be referred to as "stepped shape". When the total number of the flat portions included in the convexity and concavity of a stepped shape is "n", that stepped shape may be referred to as n-level shape.

Also in the disclosed embodiments, the term "transparent" means that an object can transmit an aimed wavelength of light. For example, if an object cannot transmit visible light but can transmit infrared light, that object will be used as a transparent object to an application in a range of infrared.

[Diffractive Optical Element]

The diffractive optical element according to the disclosed embodiments, is a diffractive optical element configured to shape light from a light source, wherein the diffractive optical element is provided with a diffractive layer having a periodic structure comprising low refractive index portions and high refractive index portions, and the high refractive index portions of the periodic structure include one having an aspect ratio of 2 or more.

The diffractive optical element of the disclosed embodiments will be explained with reference to figures. FIG. 1 is a schematic plan view of a diffractive optical element according to a first embodiment. FIG. 2 is a schematic perspective view of an example of a partial periodic structure of the diffractive optical element shown in FIG. 1. FIG. 3 is a schematic sectional view of the diffractive optical element of FIG. 2 along the line E-E'.

Figure 10:
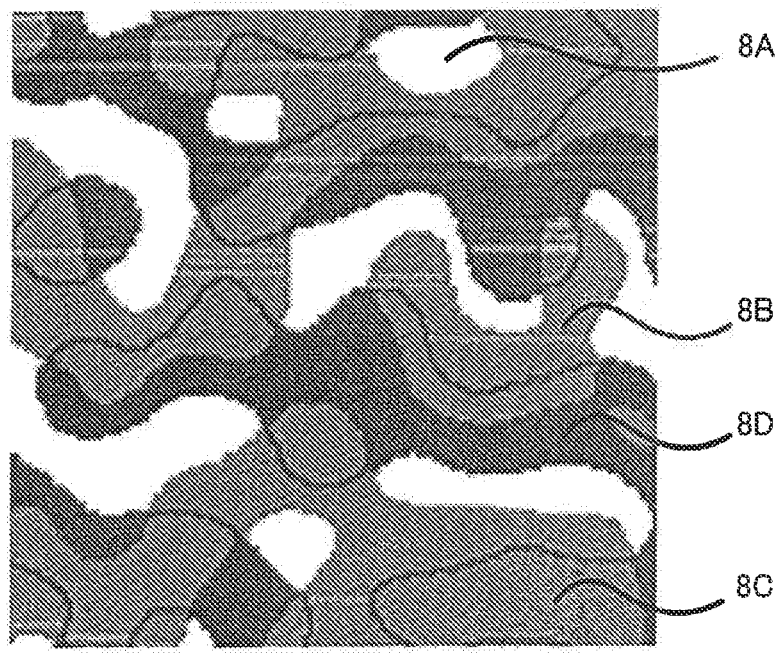
FIG. 10 is a schematic plan view of an example of a periodic structure of a diffractive layer (4-level) configured to shape incident light in a circle.

A diffractive optical element 10 of the disclosed embodiment is provided with a diffractive layer 1 having a periodic structure comprising low refractive index portions 3 and high refractive index portions 2, and the high refractive index portions 2 of the periodic structure include one having an aspect ratio (height H/width W) of 2 or more. In general, the diffractive optical element of the disclosed embodiments has a plurality of regions having different periodic structures (for example, A to D regions in FIG. 1). According to the example of FIG. 1, the A to D regions having partial periodic structures are 2-level regions composed of a concavity and a convexity (for example, a diffractive layer 1 in FIG. 3). However, to shape light in a desired shape, it is needed to appropriately design the shape and depth of the regions (for example, 8A, 8B, 8C and 8D of a 4-level diffractive element shown in FIG. 10, differ in depth (for example, see (C) in FIG. 16)).

Figure 4:
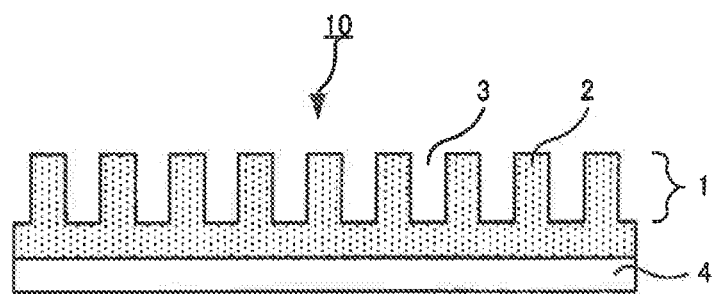
FIG. 4 is a schematic sectional view of a diffractive optical element according to an embodiment.
Figure 5:
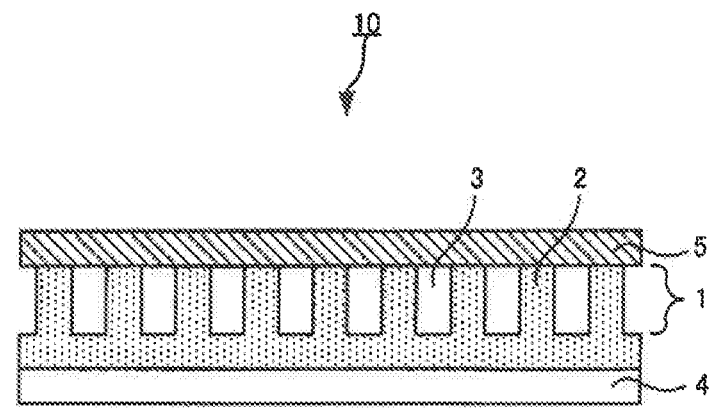
FIG. 5 is a schematic sectional view of a diffractive optical element according to another embodiment.
Figure 6:
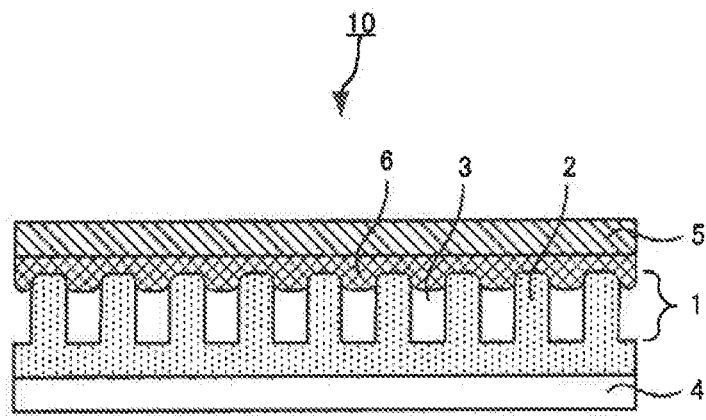
FIG. 6 is a schematic sectional view of a diffractive optical element according to another embodiment.
Figure 7:
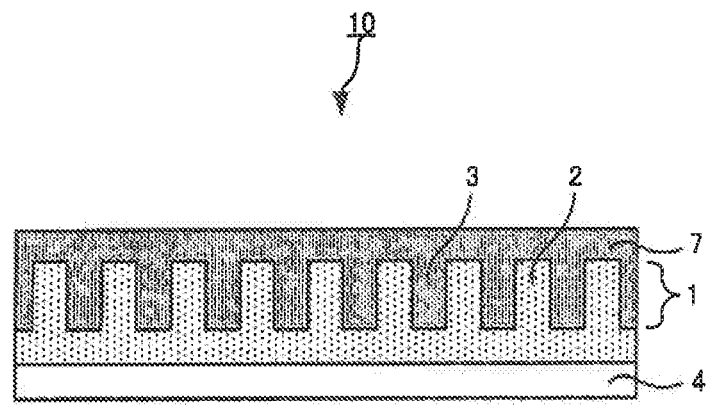
FIG. 7 is a schematic sectional view of a diffractive optical element according to another embodiment.

FIGS. 4 to 7 are each a schematic sectional view of a diffractive optical element according to another embodiment. As shown by the example of FIG. 4, for the diffractive optical element of the disclosed embodiments, the diffractive layer 1 may be disposed on a transparent substrate 4. As shown by the example of FIG. 5, a coating layer 5 may be disposed on the diffractive layer 1. As shown by the example of FIG. 6, the coating layer 5 may be disposed on the diffractive layer 1 via an adhesive layer 6. For the diffractive optical element of the disclosed embodiments, the low refractive index portions 3 are not limited to air. As shown by the example of FIG. 7, they may be composed of a low refractive index resin 7. From the viewpoint of excellent mechanical strength, the low refractive index portions are preferably composed of a low refractive index resin. From the viewpoint of obtaining a large refractive index difference, the low refractive index portions are preferably air.

Figure 8:
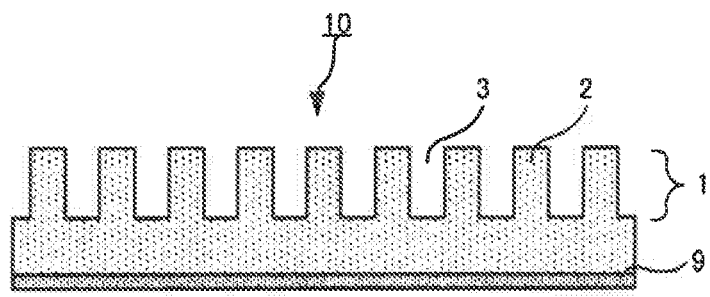
FIG. 8 is a schematic sectional view of a diffractive optical element according to another embodiment.
Figure 9:
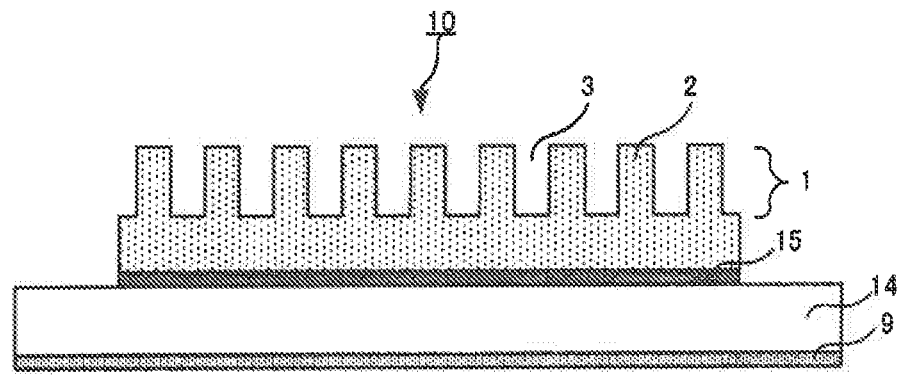
FIG. 9 is a schematic sectional view of a diffractive optical element according to another embodiment.

FIGS. 8 and 9 are each a schematic sectional view of a diffractive optical element according to another embodiment. As shown by the examples of FIGS. 8 and 9, for the diffractive optical element of the disclosed embodiments, an antireflection layer 9 is preferably disposed on the outermost surface, from the viewpoint of reducing reflected light and increasing light use efficiency.

As shown by the example of FIG. 8, the antireflection layer 9 may be directly disposed on a diffractive optical element 10 to constitute the outermost surface. As shown by the example of FIG. 9, the antireflection layer 9 may be disposed between the diffractive optical element 10 and the antireflection layer 9 via other layer or other component. In the example of FIG. 9, the diffractive optical element 10 attaches onto a surface of a glass plate 14 via an adhesive layer 15, and the antireflection layer 9 is disposed on an opposite surface of the glass plate 14. The antireflection layer 9 is preferably disposed on a light incidence-side outermost surface. The antireflection layer will be described below in detail.

In the disclosed embodiments, the convexities, which are the high refractive index portions, have an aspect ratio of 2 or more, and those convexities make it possible to provide, for example, a diffractive optical element that makes infrared light with a longer wavelength than ever before (such as infrared light with a wavelength of 900 nm or more) into a desired shape and also reduces the 0th-order light.

In the disclosed embodiments, when the convexities are in the 2-level shape, the aspect ratio is defined by (the height H of the convexities)/(the width W of the convexities). Also in the disclosed embodiments, when the convexities are in the stepped shape, the aspect ratio is defined by (the height H of the convexities)/(the minimum fabrication width W of the convexities).

Figure 15:
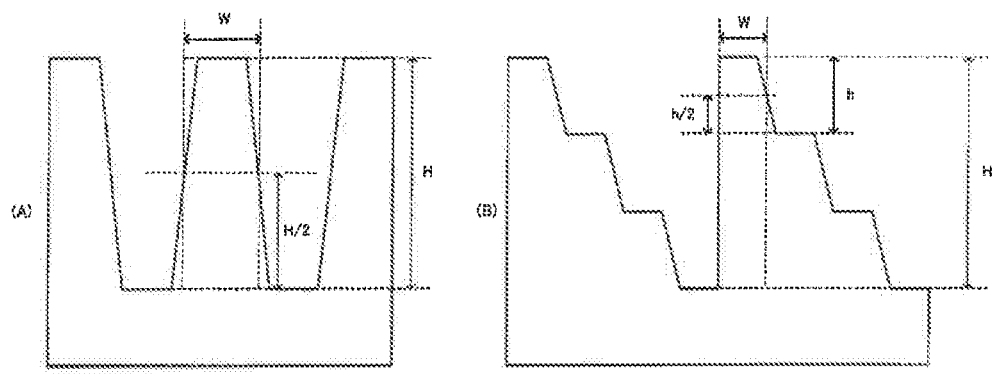
FIG. 15 is a view used for explanation of an aspect ratio.

In the disclosed embodiments, the width of the convexities is defined as the width at a height half the height h of the convexities, that is, the width at a height of (H/2) (see (A) in FIG. 15). Also in the disclosed embodiments, the minimum fabrication width of the convexities means the width of a part corresponding to a range forming the height h of the convexities in the stepped shape. In particular, like (B) in FIG. 15, the height of the flat portion of the second step, that is, the height (H-h), is determined as a bottom edge, and the flat portion at the height H is determined as a top edge. The width at a height half the height h from the bottom edge to the top edge, that is, the width at a height of (h/2), is defined as the minimum fabrication width W.

This is because, by defining the aspect ratio in this manner, a correlation between the aspect ratio and the optical design of a diffraction grating or demoldability is increased.

In particular, the height H and the width W can be measured from an image of a section of the diffractive layer taken by a scanning electron microscope (SEM).

<Shape of the Diffractive Layer>

In general, the shape of the diffraction grating is determined by the wavelength of light, the refractive index (difference) of a material that transmits light, and a required diffraction angle. For example, assume that laser light is vertically incident on the surface of the diffractive layer of the diffractive optical element, by using a material having a refractive index of 1.5 in the air. In this case, as the wavelength of the light gets longer, the optimum groove depth of the diffraction grating becomes deeper. With respect to infrared light with a wavelength of 980 nm, a depth of about 1000 nm is needed. That is, for the sectional shape of the diffractive layer of the diffractive optical element according to the disclosed embodiments, the convexities forming the high refractive index portions preferably include one having a height of 1000 nm or more.

To diffract light in a direction at a diffraction angle of 30°, the aspect ratio of the diffraction grating may be about 1. To diffract light in a direction at an angle of 70°, the aspect ratio may be about 1.87.

However, these aspect ratios are applicable just in the case where light is diffracted in one direction only. In the case of using the diffractive optical element for the light source of a sensor, it is needed to uniformly distribute diffracted light over a predetermined region. Therefore, it is needed to intricately combine various regions which are different from each other in diffraction angle and diffraction direction. As a result, a region at a very narrow pitch is included (for example, FIGS. 1 and 10). Since the optimum depth of the diffraction grating depends on the wavelength of light, the refractive index of light and the number of the level, as the pitch gets narrow, the aspect ratio becomes 2 or more, and sometimes it exceeds 4. For example, in the case of using quartz as a material to design a 2-level diffraction grating which makes laser light with a wavelength of 980 nm into a rectangular spreading shape having a long side ±50° and a short side ±3.3°, if the designed diffraction grating has the optimum depth at 1087 nm and the finest pitch at 250 nm, the maximum aspect ratio will exceed 4.

These designs can be carried out by using various kinds of simulation tools such as GratingMOD (manufactured by Rsoft) using a rigorous coupled wave analysis (RCWA) algorithm and VirtualLab (manufactured by LightTrans) using an iterative Fourier transform algorithm (IFTA).

When the light source is not laser and is LED, these designs may be carried out considering obliquely incident light.

For the diffractive optical element of the disclosed embodiment, the high refractive index portions of the periodic structure of the diffractive layer include one having an aspect ratio of 2 or more. Therefore, infrared light with a wavelength of 780 nm or more can be shaped in a desired shape.

The sectional shape of the periodic structure may be a rectangular shape as shown in FIGS. 3 to 7. The section may be a shape like (A) to (D) in FIG. 16. When the sectional shape of the high refractive index portions is in the tapered shape like the (A) to (D) in FIG. 16, excellent demoldability is provided in the production of the diffractive optical element.

Figure 16:
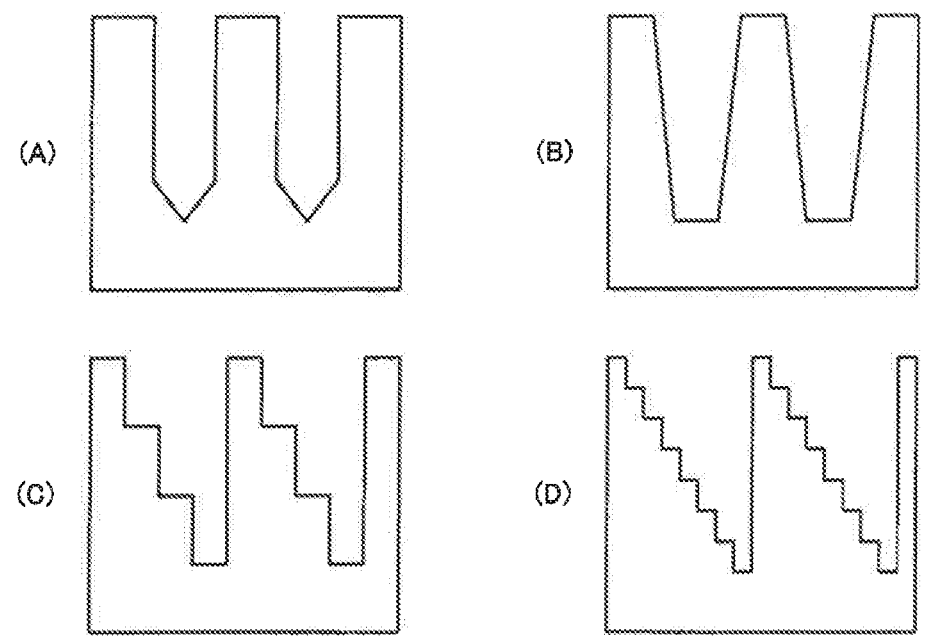
FIG. 16 is a schematic sectional view of a variation of a periodic structure.

To increase the diffraction efficiency of the diffractive optical element, it is effective to increase the number of the level from the normal 2-level (FIGS. 3 to 7) to the stepped shape such as 4-level (the (C) in FIG. 16) and 8-level (the (D) in FIG. 16). However, when the number of the level is increased too much, the mold preparation process is complicated and leads to an increase in cost. Therefore, in the disclosed embodiments, it is preferable to appropriately select the number of the level from 2- to 8-levels.

The groove depth has an influence on the aspect ratio and increases as the level gets increased. For example, in the case of using a resin having a refractive index of 1.5, the depth gets closer to twice an aimed wavelength. As the aimed wavelength gets longer, the depth required of the grooves gets deeper and increases fabrication difficulty. In general, the minimum fabricated groove width used in design is about a quarter (¼) of the aimed wavelength. To increase efficiency, the width may be smaller. However, when it is too small, the fabrication is difficult and takes a long time. Therefore, the width is preferably about 80 nm to 100 nm.

In general, the maximum aspect ratio may reach about 8. In the case of focusing on efficiency with respect to infrared light, it may increase to about 25.

In the disclosed embodiments, when the high refractive index portions having the periodic structure are formed by using the ionizing radiation curable resin composition described below, the diffractive optical element is excellent in reliability despite that the diffractive optical element includes the high refractive index portions with an aspect ratio of 2 or more and, even 4 or more. In addition, the use of the above mentioned resin composition makes it possible to obtain the diffractive optical element having the high refractive index portions with an aspect ratio of 8 or less and even an aspect ratio of 25 or less.

For the diffractive optical element of the disclosed embodiments, when the convexities are determined as line (L) and the concavities are defined as space (S), the line and space ratio (L/S) is not particularly limited and may be appropriately determined so that desired diffracted light can be obtained. For example, the line and space ratio can be determined in a range of from 0.6 to 1.2. From the viewpoint of diffraction efficiency, it is preferably in a range of from 0.8 to 1.0.

The diffractive optical element of the disclosed embodiments is preferably in a stepped shape having two or more flat portions, from the point of view that the diffraction angle can be easily increased.

Figure 13:
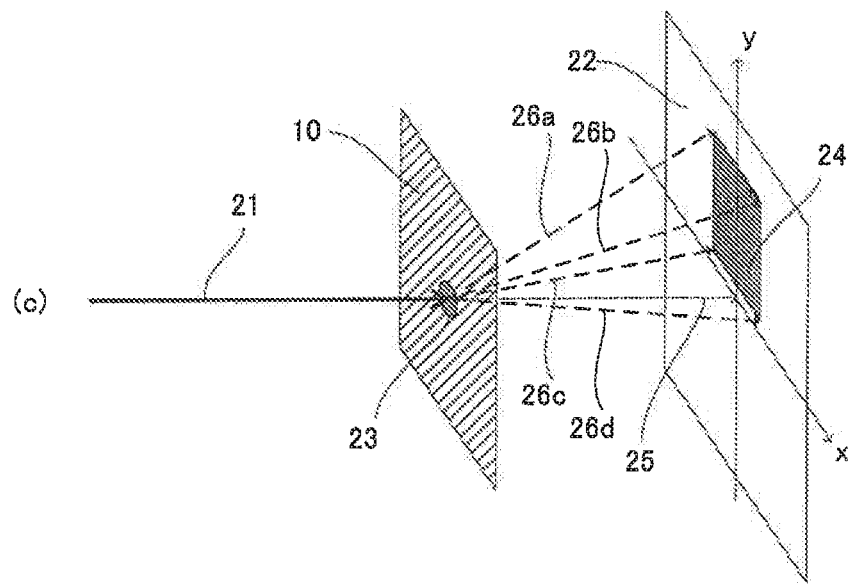
FIG. 13 is a view used for explanation of a diffractive optical element.
Figure 14:
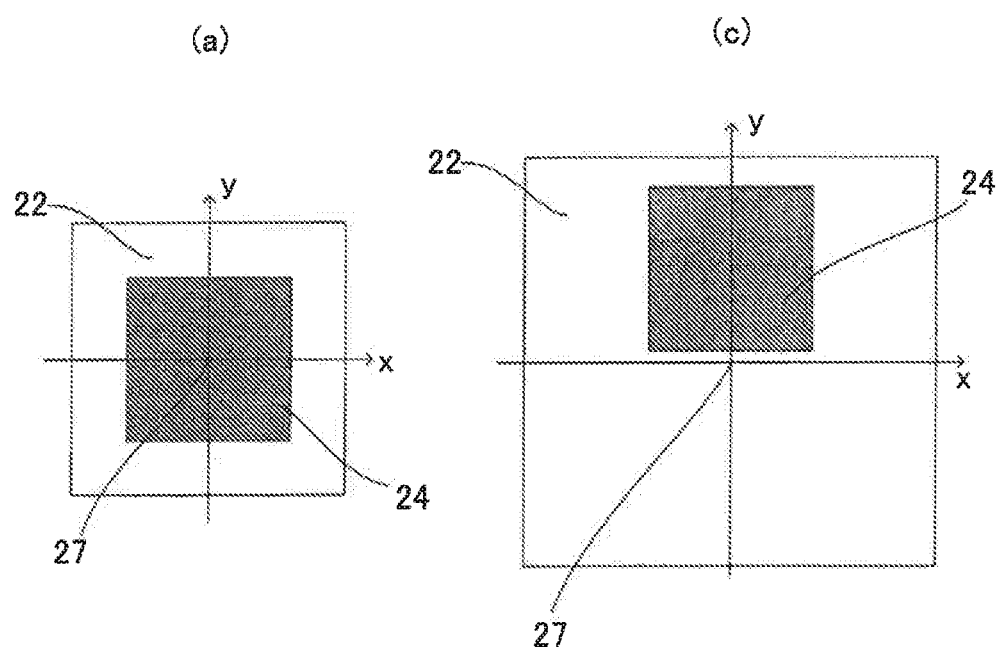
FIG. 14 shows (a) and (c), the former being a front view of a screen 22 in an example (a) shown in FIG. 12, and the latter being a front view of the screen 22 in an example (c) shown in FIG. 13.

Since the aspect ratio is 2 or more, the diffractive optical element of the disclosed embodiments can reduce the 0th-order light. In addition, when the diffraction angle is increased, diffracted light in a desired shape can be obtained while excluding the 0th-order light away. This fact will be explained with reference to figures. FIGS. 12 and 13 are each a view used for explanation of the diffractive optical element. In FIG. 14, (a) is a front view of a screen 22 in an example (a) shown in FIG. 12, and (c) is a front view of the screen 22 in an example (c) shown in FIG. 13.

For the example (a) of FIG. 12, an irradiation light 21 is diffracted by the diffractive optical element 10 to form a square image 24 on the screen 22. As shown by the (a) of FIG. 14, since the square image includes a 0th-order light irradiation position 27, the 0th-order light is contained in the image. In the disclosed embodiments, since the 0th-order light is reduced, excellent diffracted light is obtained even in this case.

For the example (c) of FIG. 13, by designing the diffraction angle of 1st-order light 26a and 1st-order light 26b to be larger than the example (a) of FIG. 12, as shown by the (c) in FIG. 14, the 0th-order light irradiation position 27 is not included in the square image. As just described, by designing the maximum diffraction angle to be large, diffracted light that does not contain the 0th-order light, can be obtained. Due to these reasons, the diffractive optical element of the disclosed embodiments is preferably in the stepped shape having two or more flat portions, and it preferably has an aspect ratio of 3.5 or more.

<Cured Product of the Ionizing Radiation Curable Resin Composition>

For the diffractive optical element of the disclosed embodiment, from the viewpoint of increasing throughput, the high refractive index portions preferably comprise a cured product of an ionizing radiation curable resin composition. The cured product of the ionizing radiation curable resin composition is obtained by curing an ionizing radiation curable resin composition described below by the action of light. By a production method described below, the cured product becomes the high refractive index portions having a predetermined periodic structure.

The inventors of the disclosed embodiments studied a method of using a diffractive optical element produced by electron beam lithography as a mold, molding on a resin, thereby making a duplicate. When the storage modulus (E') of the cured ionizing radiation curable resin is larger than $5 \times 10^9$ (Pa), a large load is required for demolding and, of the resin, a part with a high aspect ratio is sometimes broken. The reason for this is presumed to be because the resin cured in the mold is needed to be deformed to some extent when it is demolded. On the other hand, it was found that when the storage modulus (E') is smaller than $1 \times 10^8$ (Pa), the resin is easily demolded and, however, easily deformed; therefore, at the time of demolding, the resin cannot withstand stretch and may be fractured, or the durability of the diffractive layer of the diffractive optical element may be decreased. Also, it was found that when the tan δ of the cured resin exceeds 0.3, resin deformation caused at the time of demolding may not be restored, or the high refractive index portions may stick to each other (sticking) when a force is applied from the outside.

From the study results, the following is revealed: in the disclosed embodiments, it is preferable to select and use, as the ionizing radiation curable resin composition, such an ionizing radiation curable resin composition, that the storage modulus (E') at 25° C. of the cured product of the ionizing radiation curable resin composition is $1 \times 10^8$ Pa or more and $5 \times 10^9$ Pa or less, and the ratio (tan δ (=E''/E')) of the loss modulus (E'') at 25° C. of the cured product of the ionizing radiation curable resin composition with respect to the storage modulus (E') is 0.3 or less. The reason is as follows: by selecting and using such a resin composition, resin breakage or fracture is prevented; excellent demoldability is obtained; and resin deformation is prevented at the time of demolding.

In the disclosed embodiments, the storage modulus (E') and the loss modulus (E'') are measured by the following method, in accordance with JIS K7244.

First, by UV irradiation with an energy of 2000 mJ/cm$^2$ for one or more minutes, the ionizing radiation curable resin composition is sufficiently cured and made into a monolayer which has a thickness of 1 mm, a width of mm and a length of 30 mm and which does not have a substrate and a convexo-concave shape.

Next, at a temperature of 25° C., an external force (10 Hz, 25 g) with a periodic cycle is applied in the length direction of the cured product of the resin composition, and the dynamic viscoelasticity of the cured product is measured, thereby obtaining the E' and E'' at 25° C. As a measurement device, for example, Rheogel E400 (manufactured by UBM) can be used.

Also, the storage modulus (E'), loss modulus (E'') and tan δ of the DOE surface can be obtained by pressing an indenter into the DOE-side surface. As a measurement device, for example, a nanoindentation system such as T1950 Triboindenter +nanoDMA III (manufactured by Hysitron) can be used.

In the disclosed embodiments, the storage modulus (E') at 25° C. of the cured product of the ionizing radiation curable resin composition is $1 \times 10^8$ Pa or more and $5 \times 10^9$ Pa or less. From the viewpoint of preventing resin breakage or fracture, obtaining excellent demoldability, and preventing resin deformation at the time of demolding, the storage modulus (E') is preferably $2 \times 10^8$ Pa or more and $4 \times 10^9$ Pa or less.

In the disclosed embodiments, the tan δ is 0.3 or less. From the viewpoint of preventing resin breakage or fracture, obtaining excellent demoldability, and preventing resin deformation at the time of demolding, the tan δ is preferably from 0.01 to 0.25.

In the disclosed embodiments, the refractive index of the cured product of the resin composition constituting the high refractive index portions, is not particularly limited. It is preferably from 1.4 to 2.0, and more preferably from 1.45 to 1.8. According to the disclosed embodiments, the high refractive index portions can be stably formed into a shape having an aspect of 2 or more, and even in the case of using a resin having a lower refractive index than silicon oxide, etc., an excellent diffractive optical element can be obtained.

Also in the disclosed embodiments, the transmittance of the cured product of the resin composition constituting the high refractive index portions, is not particularly limited. The infrared transmittance (wavelength 850 nm) of the cured product is preferably 90% or more, and more preferably 92% or more.

(Ionizing Radiation Curable Resin Composition)

The ionizing radiation curable resin composition is preferably a resin composition which contains an ionizing radiation curable component and which can provide a cured product with the above properties. Even if the cured product is found to be colored by visual observation, the cured product is sufficient for practical use as long as it can transmit designed light with an aimed wavelength.

In the case where double refraction is present in a material for forming the diffractive layer of the diffractive optical element, shape design considering the double refraction is needed. However, in the case of using the ionizing radiation curable resin composition in molding, there is an advantage that the influence of the double refraction can be largely ignored in practical use.

The ionizing radiation curable component is preferably a composition that contains a compound having an ethylenically unsaturated bond, and more preferably a composition that contains (meth)acrylate.

The ionizing radiation curable resin composition may contain at least the ionizing radiation curable component. As needed, it may further contain other component.

From the point of view that the high refractive index portions of the diffractive layer obtain excellent flexibility and are prevented from being broken or fractured, the resin composition preferably contains a compound that has a long-chain alkyl group having 12 or more carbon atoms.

The ionizing radiation curable resin compound preferably contains (meth)acrylate as the ionizing radiation curable component. Hereinafter, the components that may be included in the ionizing radiation curable resin compound will be described.

The (meth)acrylate may be any one of the following: a monofunctional (meth)acrylate containing one (meth)acryloyl group per molecule, a polyfunctional acrylate containing two or more (meth)acryloyl groups per molecule, and a combination of the monofunctional (meth)acrylate and the polyfunctional (meth)acrylate.

Especially, the combination of the monofunctional (meth)acrylate and the polyfunctional (meth)acrylate is preferably used, from the point of view that the cured product obtains all of the above properties, and the high refractive index portions obtain both flexibility and elastic restorability.

As the monofunctional (meth)acrylate, examples include, but are not limited to, methyl (meth)acrylate, hexyl (meth)acrylate, allyl (meth)acrylate, benzyl (meth)acrylate, butoxyethyl (meth)acrylate, butoxyethylene glycol (meth)acrylate, cyclohexyl (meth)acrylate, dicyclopentanyl (meth)acrylate, 2-ethylhexyl (meth)acrylate, glycerol (meth)acrylate, glycidyl (meth)acrylate, 2-hydroxyethyl (meth)acrylate, 2-hydroxypropyl (meth)acrylate, isobornyl (meth)acrylate, isodecyl (meth)acrylate, isooctyl (meth)acrylate, lauryl (meth)acrylate, 2-methoxyethyl (meth)acrylate, methoxyethylene glycol (meth)acrylate, phenoxyethyl (meth)acrylate, stearyl (meth)acrylate, dodecyl (meth)acrylate, tridecyl (meth)acrylate, biphenyloxy ethyl acrylate, bisphenol A diglycidyl (meth)acrylate, biphenyloxy ethyl (meth)acrylate, ethylene oxide-modified biphenyloxy ethyl (meth)acrylate, and bisphenol A epoxy (meth)acrylate. These monofunctional (meth)acrylic acid esters may be used alone or in combination of two or more.

The content of the monofunctional (meth)acrylate is preferably from 5% by mass to 40% by mass, and more preferably from 10% by mass to 30% by mass, with respect to the total solid content of the ionizing radiation curable resin composition.

As the polyfunctional acrylate, examples include, but are not limited to, diethylene glycol di(meth)acrylate, diethylene glycol di(meth)acrylate, propylene di(meth)acrylate, hexanediol di(meth)acrylate, polyethylene glycol di(meth)acrylate, bisphenol A di(meth)acrylate, tetrabromo bisphenol A di(meth)acrylate, bisphenol S di(meth)acrylate, butanediol di(meth)acrylate, phthalic di(meth)acrylate, ethylene oxide-modified bisphenol A di(meth)acrylate, trimethylolpropane tri(meth)acrylate, pentaerythritol tri(meth)acrylate, pentaerythritol tetra(meth)acrylate, tris(acryloxyethyl) isocyanurate, pentaerythritol tetra(meth)acrylate, dipentaerythritol hexa(meth)acrylate, urethane tri(meth)acrylate, ester tri(meth)acrylate, urethane hexa(meth)acrylate, and ethylene oxide-modified trimethylolpropane tri(meth)acrylate. From the viewpoint of excellent flexibility and restorability, the polyfunctional acrylate is preferably a polyfunctional (meth)acrylate containing an alkylene oxide, more preferably an ethylene oxide-modified polyfunctional (meth)acrylate, and still more preferably at least one selected from ethylene oxide-modified bisphenol A di(meth)acrylate, ethylene oxide-modified trimethylolpropane tri(meth)acrylate, and polyethylene glycol di(meth)acrylate.

The content of the polyfunctional (meth)acrylate is preferably from 10% by mass to 70% by mass, and more preferably from 15% by mass to 65% by mass, with respect to the total solid content of the ionizing radiation curable resin composition.

As needed, the ionizing radiation curable resin composition may contain a photopolymerization initiator. The content of the photopolymerization initiator is generally from 1% by mass to 20% by mass, and more preferably from 2% by mass to 10% by mass, with respect to the total solid content of the ionizing radiation curable resin composition.

Also, it is preferable to add a release agent (a material with demoldability) to the resin composition. Especially in the case where detachment stress from the mold is large, a decrease in mold life is caused by resin clogging. Therefore, as needed, the release agent can be appropriately selected from conventionally known release agents such as silicon-based, fluorine-based and phosphoric ester-based release agents. Depending on the intended application, the release agent may be selected from those which can be fixed to the crosslinked structure of the resin composition and which can be present in a free state.

Other additives may be added to the ionizing radiation curable resin composition, such as an antistatic agent, an UV absorber, an infrared absorber, a light stabilizer and an antioxidant. The antistatic agent is effective in preventing dust attachment in a fabrication process or in use. The UV absorber, the infrared absorber, the light stabilizer and the antioxidant are effective in increasing durability. In the case of adding a light absorbing material, care is needed not to affect the aimed wavelength of the diffractive optical element. For the purpose of improving heat resistance, a composite material which is prepared by compounding the ionizing radiation curable resin composition with an inorganic material (such as silsesquioxane) is effective.

From the viewpoint of environmental concerns, it is preferable that the ionizing radiation curable resin composition does not substantially contain a solvent. However, considering adhesion to a substrate, viscosity control, surface quality improvement, etc., the ionizing radiation curable resin composition may contain a solvent. In the case of containing the solvent, molding is carried out after applying the resin to a substrate or a mold and drying the solvent.

<Transparent Substrate>

As needed, the diffractive optical element of the disclosed embodiments may include a transparent substrate.

The transparent substrate used in the disclosed embodiments may be appropriately selected from conventionally known transparent substrates, depending on the intended application. As the material for the transparent substrate, examples include, but are not limited to, acetyl cellulose resins such as triacetyl cellulose; polyester resins such as polyethylene terephthalate and polyethylene naphthalate; olefin resins such as polyethylene and polymethylpentene; acrylic resins; polyurethane resins; transparent resins such as polyethersulfone, polycarbonate, polysulfone, polyether, polyether ketone, acrylonitrile, methacrylonitrile, cycloolefin polymer, and cycloolefin copolymer; glasses such as soda glass, potash glass and lead glass; ceramics such as PLZT; and transparent inorganic materials such as quartz and fluorite. The double refraction of the transparent substrate has no influence on the effect of the diffractive optical element. However, in the case where retardation between light incident on and light diffused in the diffractive optical element becomes an issue, a substrate with suitable double refraction may be appropriately selected.

As used herein, "transparent" means such a state that the other side is transparently seen by visual observation. As long as the diffractive optical element can transmit designed light with an aimed wavelength, the diffractive optical element is sufficient for practical use, even if it is found to be colored by visual observation. In the case of curing the ionizing radiation curable resin composition by applying ionizing radiation from the transparent substrate side, the transparent substrate is preferably one that can transmit ionizing radiation as much as possible.

The thickness of the transparent substrate can be appropriately determined depending on the intended application of the disclosed embodiments, and it is not particularly limited. The thickness is generally from 20 μm to 5000 μm. The transparent substrate may be any of the followings: a transparent substrate supplied in the shape of a roll; a transparent substrate that cannot be rolled but can be curved by applying a load; and a transparent substrate that cannot be bent at all.

The structure of the transparent substrate used in the disclosed embodiments is not limited to a monolayer structure and may be a multilayered structure. When the transparent substrate has a multilayered structure, the multilayered structure may be composed of layers of an identical composition or layers of different compositions.

To increase adhesion to the resin composition, a surface treatment or primer layer formation may be carried out on the transparent substrate. The surface treatment may be a general adhesion improving treatment such as corona treatment and atmospheric-pressure plasma treatment. The primer layer is preferably one which has adhesion to both the transparent substrate and the resin composition, and which can transmit an aimed wavelength of light. However, depending on the intended application, the adhesion between the transparent substrate and the resin composition can be purposely kept low, and the diffractive layer can be removed from the transparent substrate after molding. This is effective especially in the case where the diffractive optical element is needed to be thin.

From the viewpoint of preventing the diffractive layer from scratching, etc., and obtaining excellent mechanical strength, the diffractive optical element of the disclosed embodiments may have such a structure that the diffractive layer and a coating layer are disposed in this sequence on the transparent substrate. The coating layer is not particularly limited, and it is preferably one that is similar to the coating layer of the above-described transparent substrate. In the case of disposing the coating layer on the diffractive layer, an adhesive layer may be disposed between the diffractive layer and the coating layer. An adhesive for the adhesive layer may be appropriately selected from conventionally known adhesives. For example, any one of the following can be appropriately used: a pressure-sensitive adhesive, a two-component curable adhesive, an ultraviolet curable adhesive, a thermosetting adhesive and a thermofusible adhesive. When the low refractive index portions are air, an adhesive with low flowability is preferably used. When part of the low refractive index portions will be immersed in the adhesive, the diffractive layer may be designed considering the low refractive index portions to be immersed.

By disposing the coating layer, such a secondary effect can be expected, that it is possible to prevent reduplication using the concavities and convexities of the diffraction grating as a mold.

In addition, by forming the coating layer, it is possible to prevent foreign substances from entering the diffractive layer and to increase the long-term reliability of the diffractive optical element and that of the light irradiation apparatus.

An antireflection layer may be further disposed on a surface of the transparent substrate or coating layer, which is opposite to the surface on which the diffractive layer is disposed. The antireflection layer may be appropriately selected from conventionally known antireflection layers. For example, the antireflection layer may be a monolayer composed of a low or high refractive index layer, a multi-layered film composed of a low refractive index layer and a high refractive index layer, or an antireflection layer on which a fine convexo-concave shape is formed. By disposing the antireflection layer, the diffraction efficiency of the diffractive optical element can be increased.

The transparent substrate, the coating layer and the adhesive layer may contain conventionally known additives, as long as the effects of the disclosed embodiments are not impaired. As the additives, examples include, but are not limited to, an UV absorber, an infrared absorber, a light stabilizer and an antioxidant.

<Method for Producing Diffractive Optical Element>

For the diffractive optical element of the disclosed embodiments, the high refractive index portions of the periodic structure of the diffractive layer include one having an aspect ratio of 2 or more. Therefore, breakage or sticking is likely to occur at the time of demolding.

In the disclosed embodiments, therefore, the diffractive optical element is preferably produced by the following production method.

That is, the method is to produce a diffractive optical element that is configured to shape light from a light source, the method comprising steps of:

preparing a mold for producing a diffractive optical element having a predetermined periodic structure;

forming a coating film by applying an ionizing radiation curable resin composition to the mold;

forming a cured film of the ionizing radiation curable resin composition by irradiating the coating film with ionizing radiation; and demolding the cured film from the mold, wherein a storage modulus (E') at 25° C. of the cured product of the ionizing radiation curable resin composition is $1 \times 10^8$ Pa or more and $5 \times 10^9$ Pa or less, and a ratio (tan δ (=E″/E′)) of a loss modulus (E″) at 25° C. of the cured product of the ionizing radiation curable resin composition with respect to the storage modulus (E′) is 0.3 or less.

Figure 17:
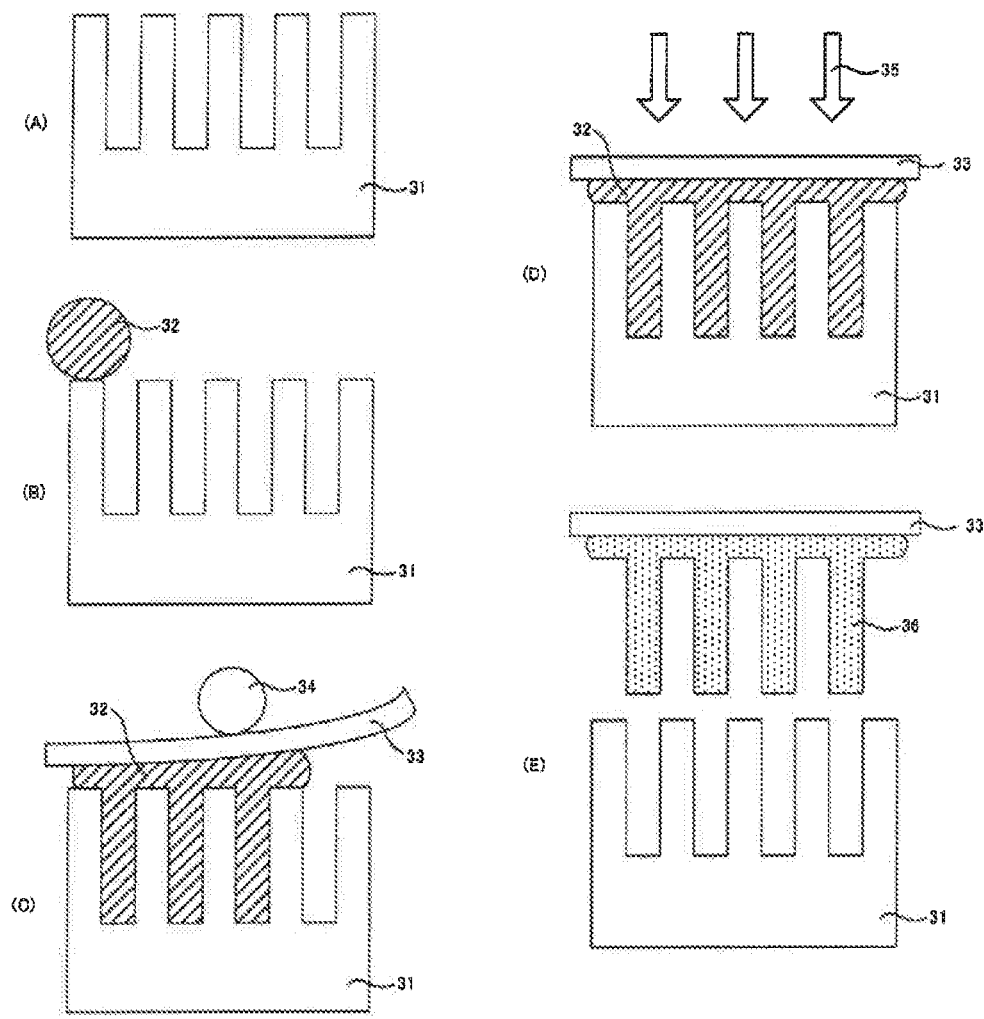
FIG. 17 is a schematic process chart of an example of a method for producing a diffractive optical element.

A preferred example of the method for producing the diffractive optical element, will be explained with reference to figures. FIG. 17 is a schematic process chart of an example of a method for producing a diffractive optical element. As shown by the example of FIG. 17, first, a mold 31 having a desired periodic structure formed thereon, is prepared ((A) in FIG. 17). Then, a coating film is formed by applying an ionizing radiation curable resin composition 32, which is the above-described ionizing radiation curable resin composition, to the surface of the mold ((B) and (C) in FIG. 17). The method for applying the resin composition is not particularly limited and may be appropriately selected from conventionally known methods. In the example of FIG. 17, a transparent substrate 33 is disposed on the ionizing radiation curable resin composition 32, and the ionizing radiation curable resin composition 32 is evenly applied by using a pressure roller 34. Then, a coating film thus obtained is irradiated with ionizing radiation (35) to cure the ionizing radiation curable resin composition, thereby obtaining a cured film 36 ((D) in FIG. 17). The thus-obtained cured film 36 is demolded from the mold 31, thereby obtaining a diffractive optical element ((E) in FIG. 17). Then, as needed, the transparent substrate 33 may be removed (not shown).

Hereinafter, the steps of the production method will be described. However, the same matters as described for the diffractive optical element of the disclosed embodiments will not be described below.

The mold for producing the diffractive optical element can be fabricated by a technique such as laser lithography, electron beam lithography and a focused ion beam (FIB) technique. In general, electron beam lithography is preferably used.

As the material for the mold, a material available for high-aspect-ratio fabrication can be used. In general, quartz and Si are used. Also, a copy mold (soft mold) duplicated from the obtained mold with the use of a resin or a copy mold duplicated by Ni electroforming, can be used.

As needed, a release treatment can be carried out on the mold surface. In the treatment, for example, a fluorine-based or silicon-based release agent, diamond-like carbon or Ni plating can be used. The treatment method can be appropriately selected from gas-phase treatments such as deposition, sputtering and atomic layer deposition (ALD) and liquid-phase treatments such as coating, dipping and plating.

In general, the shape required of the diffractive optical element is a small square in mm or cm scale. Therefore, duplication efficiency can be increased by fabricating the inside of the mold so as to align the shapes of a plurality of diffractive layer. In the case of focusing on throughput, a plurality of the molds or copy molds may be aligned and duplicated to make a multifaceted mold, and the obtained multifaceted mold is used for duplicating.

When a change in the volume of the ionizing radiation curable resin composition at the time of curing, is a problem, mold design can be carried out after correcting it. Considering demoldability, the mold may have such a fine structure that the diameter size at the opening side of the fine structure is larger than that at the bottom side thereof ((A) to (D) in FIG. 16). In this case, the diffractive layer of the thus-obtained diffractive optical element is in a tapered shape that is tapered toward the surface side.

In the diffractive optical element of the disclosed embodiments, generally, a plurality of regions with different periodic structures are present; therefore, a plurality of grooves different in pitch are included in one diffractive optical element. However, in the case of producing such a mold, depending on pitch, an etching depth in a dry etching process tends to be irregularly varied. However, since the variation leads to a decrease in efficiency, it is important to optimize the fabrication process and reduce the variation to ±10% or less of the desired depth.

In the case of forming the convexities having an aspect ratio of 2 or more, height variation in the convexities tends to occur. In this case, by fabricating the mold so that the depth of the mold is slightly deeper than the designed value, the diffractive optical element that has desired optical properties, while it has height variation, can be easily obtained.

Next, the coating film of the ionizing radiation curable resin composition is formed. The above-mentioned example is an example of forming the coating film of the ionizing radiation curable resin composition on the mold side. Meanwhile, the coating film may be formed on the transparent substrate side. The method for forming the coating film may be selected from the above-mentioned example and conventionally known coating methods such as die coating, bar coating, gravure coating and spin coating.

The transparent substrate may be a sheet substrate, or a long substrate may be used and subjected to a roll-to-roll coating process, an ionizing radiation irradiation process, and a demolding process, in sequence. When the mold is made of a less-flexible hard material, the transparent substrate is preferably a flexible substrate since bubbles are less likely to be formed. On the other hand, when a hard material is used as the transparent substrate, the mold is preferably a soft mold.

Ultraviolet or electron beam irradiation may be carried out at one time or several times. In the case of carrying out the irradiation at several times, it can be carried out in such a manner that the ionizing radiation curable resin composition is cured to some extent, demolded, and then subjected to additional irradiation.

The ionizing radiation curable resin cannot fill the fine grooves very well, when the flowability of the resin is too low at the time of coating. When the flowability is too high, an ink spreads out thinly and widely, and a predetermined thickness may not be obtained, therefore. In the case of roll imprinting, when the flowability is too high, the ink may drop. In the disclosed embodiments, it is preferable to use the ionizing radiation curable resin composition having a viscosity at 25° C. of about several tens to several thousands of mPas. Since the viscosity varies depending on temperature, appropriate temperature control is preferably carried out.

[Light Irradiation Apparatus]

The light irradiation apparatus according to the disclosed embodiments comprises a light source and at least one diffractive optical element according to the disclosed embodiments.

The light irradiation apparatus of the disclosed embodiments can emit light shaped in a desired shape.

Figure 11:
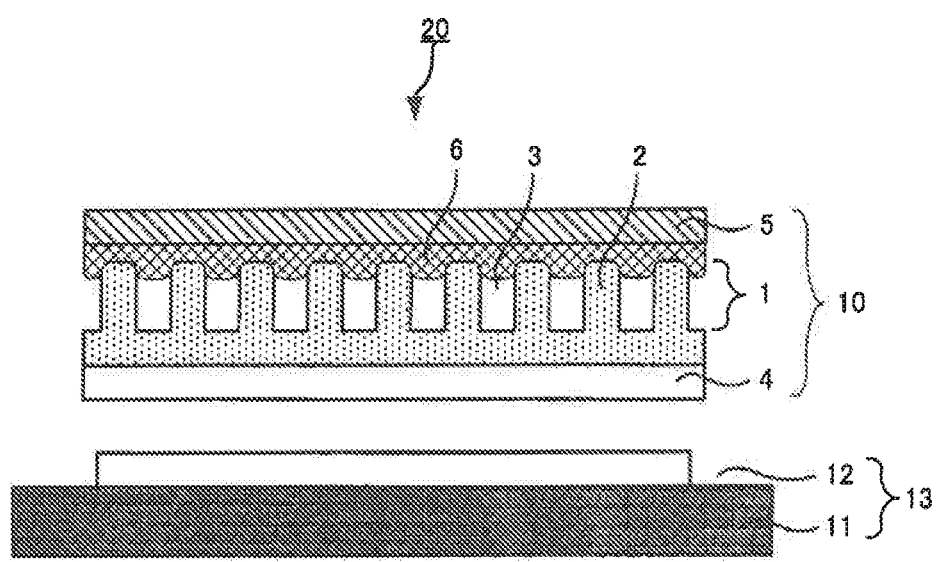
FIG. 11 is a schematic sectional view of a light irradiation apparatus according to an embodiment.

The light irradiation apparatus of the disclosed embodiments will be explained with reference to figures. FIG. 11 is a schematic sectional view of a light irradiation apparatus according to an embodiment. A light irradiation apparatus 20 shown by the example of FIG. 11 comprises the diffractive optical element 10 of the disclosed embodiments, which is disposed on the light output surface side of a light source 13 comprising a substrate 11 and a light emitting body 12. For the example of FIG. 11, the transparent substrate 4 is disposed on the light source 13 side; however, the coating layer 5 may be disposed on the light source 13 side. For example, when any one of the transparent substrate 4, the coating layer 5 and an adhesive layer 6 contains an UV absorber, from the viewpoint of increasing the light resistance of the diffractive optical element, the layer containing the UV absorber is preferably disposed on the surface on the opposite side to the light source (that is, the surface on which sunlight, etc., is incident).

Hereinafter, the light irradiation apparatus of the disclosed embodiments will be described. The diffractive optical element will not be described since it is the same as the above-mentioned diffractive optical element of the disclosed embodiments.

For the light irradiation apparatus of the disclosed embodiments, the light source is not particularly limited, and a known light source can be used. Since the above-mentioned diffractive optical element of the disclosed embodiments is designed for the purpose of diffracting the specific wavelength, for example, a laser or LED (light emitting diode) light source that is high in the intensity of the specific wavelength, is preferably used as the light source. In the disclosed embodiments, any light source can be preferably used, such as a directional laser light source and a diffusive LED (light emitting diode) light source.

In the disclosed embodiments, it is preferable to appropriately select the light source from those that can reproduce the light source that was regarded as the simulation target at the time of designing the diffractive optical element of the disclosed embodiments. Especially in the case of using the diffractive optical element that diffracts infrared light with a wavelength of 780 nm or more, it is preferable to select a light source capable of emitting infrared light with a wavelength of 780 nm or more.

The light irradiation apparatus of the disclosed embodiments may comprise at least one diffraction grating of the disclosed embodiments. As needed, it may further comprise a different optical element. As the different optical element, examples include, but are not limited to, a polarization plate, a lens, a prism, and a pass filter that transmits the specific wavelength, especially the aimed wavelength of the diffractive optical element. In the case of using a plurality of optical elements in combination, from the viewpoint of reducing interface reflection, the optical elements are preferably attached to each other.

<Intended Applications of the Light Irradiation Apparatus>

The light irradiation apparatus of the disclosed embodiments can be preferably used as a light irradiation apparatus for sensors, since it can emit light shaped in a desired shape and can use infrared light. Since the light irradiation apparatus can effectively regulate the shape of light, it can be used in night-time infrared illumination, lighting for security sensors, lighting for human detection sensors, lighting for collision avoidance sensors for unmanned aircrafts, cars, etc., lighting for personal identification devices, and lighting for detectors, for example. The light irradiation apparatus can realize simplification of light sources, downsizing of light sources and low-power light sources.

EXAMPLES

Hereinafter, the disclosed embodiments will be further clarified by the following examples. The disclosed embodiments are not limited by these examples.

(Design of Diffraction Grating)

Shape design was carried out under the following condition, by use of a simulation tool.

Target light source: Laser light with a wavelength of 980 nm

Material refractive index: 1.456

Diffusion shape: A rectangular shape having a long side ±50° and a short side ±3.3°

Area size: 5-mm Square

Level of diffraction grating: 2-Level

For the diffraction grating shape thus obtained, the optimum depth was 1087 nm; the finest pitch was 250 nm; and the maximum aspect ratio was 4.35.

(Mold Production)

Using a 6 inch square synthetic quartz plate, a quartz DOE in a designed shape was produced by an electron beam lithography process using an electron beam lithography apparatus and a dry etching apparatus.

By SEM observation, it was confirmed that the DOE had a predetermined size. Then, 980 nm-laser was applied to the DOE, and diffracted light was projected onto a screen and observed with an infrared camera. As a result, it was confirmed that the diffracted light was spreading in a predetermined rectangular shape.

(Resin Molding Method)

Diffractive layer-molding out of resin was carried out as follows.

First, using the above-mentioned quartz DOE as a mold, any one of ionizing radiation curable resin compositions of Examples and Reference Examples shown below, was dropped to the diffractive surface of the mold. Next, a PET film ("Cosmoshine A4300" manufactured by Toyobo Co., Ltd., thickness 100 μm) was used as a transparent substrate and placed on the dropped resin composition. They were laminated together by applying pressure from above with a roller, thereby evenly spreading the ionizing radiation curable resin composition. While the laminate was left in that state, the ionizing radiation curable resin was cured by UV irradiation at 2000 mJ/cm$^2$ from the transparent substrate side. Then, the transparent substrate and a molded layer were demolded, thereby obtaining a diffractive optical element.

(Measurement of the Properties of the Cured Ultraviolet Curable Resin Composition)

Ultraviolet curable resin compositions 1 to 7 shown in the following Table 1 were prepared. Each resin composition was sufficiently cured by UV irradiation with an energy of 2000 mJ/cm$^2$ for one or more minutes, thereby obtaining a single film for testing, which had a thickness of 1 mm, a width of 5 mm and a length of 30 mm, and which did not have a substrate and a convexo-concave shape.

Next, in accordance with JIS K7244, at 25° C., an external force with a periodic cycle (10 Hz, 25 g) was applied in the length direction of the cured product of the resin composition to measure the dynamic viscoelasticity of the cured product, thereby obtaining a storage modulus E' and a loss modulus E" at 25° C. From the results of the E' and E", a tan δ was calculated. As a measurement device, Rheogel E400 (manufactured by UBM) was used. The results are shown in Table 1.

TABLE 1

| | Ionizing radiation curable resin composition | Properties of (cured) ionizing radiation curable resin at 25° C. | |
|---|---|---|---|
| | | Storage modulus (Pa) | tan δ |
| Example 1 | Ultraviolet curable resin composition 1 | 1.4 × 10$^9$ | 0.091 |

TABLE 1-continued

| | Ionizing radiation curable resin composition | Properties of (cured) ionizing radiation curable resin at 25° C. | |
|---|---|---|---|
| | | Storage modulus (Pa) | tan δ |
| Example 2 | Ultraviolet curable resin composition 2 | $3.5 \times 10^9$ | 0.027 |
| Example 3 | Ultraviolet curable resin composition 3 | $2.8 \times 10^8$ | 0.11 |
| Example 4 | Ultraviolet curable resin composition 4 | $4.0 \times 10^8$ | 0.22 |
| Reference Example 1 | Ultraviolet curable resin composition 5 | $7.4 \times 10^9$ | 0.012 |
| Reference Example 2 | Ultraviolet curable resin composition 6 | $1.0 \times 10^8$ | 0.6 |
| Reference Example 3 | Ultraviolet curable resin composition 7 | $8.0 \times 10^6$ | 0.8 |

Example 1

A diffractive optical element 1 was obtained by the resin molding method, using the ultraviolet curable resin composition 1. The appearance of the thus-obtained diffractive optical element 1 was good. Then, 980 nm-laser was applied, and the shape of diffracted light was observed with the infrared camera. As a result, it was confirmed that the shape was in a predetermined rectangular shape. High shape reproducibility was also confirmed by SEM (scanning electron microscope) observation. The diffractive optical element 1 was not scratched just by wiping with a soft cloth ("Savina Minimax" manufactured by Fuji Chemical Industries, Ltd.)

Example 2

A diffractive optical element 2 was obtained in the same manner as Example 1, except that the ultraviolet curable resin composition 2 was used in place of the ultraviolet curable resin composition 1. The appearance of the thus-obtained diffractive optical element 2 was good. Then, 980 nm-laser was applied, and the shape of diffracted light was observed with the infrared camera. As a result, it was confirmed that the shape was in a predetermined rectangular shape. High shape reproducibility was also confirmed by SEM observation. The diffractive optical element 2 was not scratched just by wiping with the soft cloth ("Savina Minimax" manufactured by Fuji Chemical Industries, Ltd.)

Example 3

A diffractive optical element 3 was obtained in the same manner as Example 1, except that the ultraviolet curable resin composition 3 was used in place of the ultraviolet curable resin composition 1. The appearance of the thus-obtained diffractive optical element 3 was good. Then, 980 nm-laser was applied, and the shape of diffracted light was observed with the infrared camera. As a result, it was confirmed that the shape was in a predetermined rectangular shape. High shape reproducibility was also confirmed by SEM observation. The diffractive optical element 3 was not scratched just by wiping with the soft cloth ("Savina Minimax" manufactured by Fuji Chemical Industries, Ltd.) However, it was sometimes scratched by strong wiping with the soft cloth.

Example 4

A diffractive optical element 4 was obtained in the same manner as Example 1, except that the ultraviolet curable resin composition 4 was used in place of the ultraviolet curable resin composition 1. The appearance of the thus-obtained diffractive optical element 4 was good. Then, applying 980 nm-laser was applied, and the shape of diffracted light was observed with the infrared camera. As a result, it was confirmed that the shape was in a predetermined rectangular shape. High shape reproducibility was also confirmed by SEM observation. The diffractive optical element 4 was not scratched just by wiping with the soft cloth ("Savina Minimax" manufactured by Fuji Chemical Industries, Ltd.) However, traces were left on the diffractive optical element 4 by strong wiping with the soft cloth and disappeared over time.

Reference Example 1

A diffractive optical element was produced in the same manner as Example 1, except that the ultraviolet curable resin composition 5 was used in place of the ultraviolet curable resin composition 1. The resin cracked at the time of demolding, and damage to the fine shape of the diffractive optical element was observed by SEM observation.

Reference Example 2

A diffractive optical element was produced in the same manner as Example 1, except that the ultraviolet curable resin composition 6 was used in place of the ultraviolet curable resin composition 1. Traces were left on the thus-obtained diffractive optical element by wiping with the soft cloth ("Savina Minimax" manufactured by Fuji Chemical Industries, Ltd.) and did not disappear thereafter.

Reference Example 3

A diffractive optical element was produced in the same manner as Example 1, except that the ultraviolet curable resin composition 7 was used in place of the ultraviolet curable resin composition 1. The diffractive layer of the thus-obtained diffractive optical element was turbid and white, and deformation of the wall of the fine shape was observed by SEM observation.

Example 5

Various diffractive optical elements were produced by using the ultraviolet curable resin composition 1.

Example 5-1

Production of a 2-Level Mold

Using a 6 inch square synthetic quartz plate, a mold B was produced by the electron beam lithography process using the electron beam lithography apparatus and the dry etching apparatus. The mold B included a 2-level diffraction pattern having a line width of 147 nm, a space width of 151 nm, and a groove height (depth) of 952 μm.

Next, a diffractive optical element was obtained in the same manner as the above-mentioned resin molding method, except that the mold B was used.

(Measurement of the Shape of the Cured Ultraviolet Curable Resin Composition)

A section of the diffractive optical element obtained in Example 5-1 was confirmed by SEM observation. As a result, it was found that a pattern having a resin width of 151 nm and a resin height (depth) of 928 nm (aspect ratio: 6.15) was successfully molded without collapse or breaking off of projections. A light spreading shape as designed, was confirmed by carrying out light spreading with the use of a predetermined optical system.

Example 5-2

Production of a Mold in a Stepped Shape (4-Level Mold)

Using a 6 inch square synthetic quartz plate, a mold C was produced by the electron beam lithography process using the electron beam lithography apparatus and the dry etching apparatus. The mold C included a 4-level diffraction pattern having a pitch of 400 nm and a depth of 767 nm.

Next, a diffractive optical element was obtained in the same manner as the above-mentioned resin molding method, except that the mold C was used.

(Measurement of the Shape of the Cured Ultraviolet Curable Resin Composition)

Figure 18:
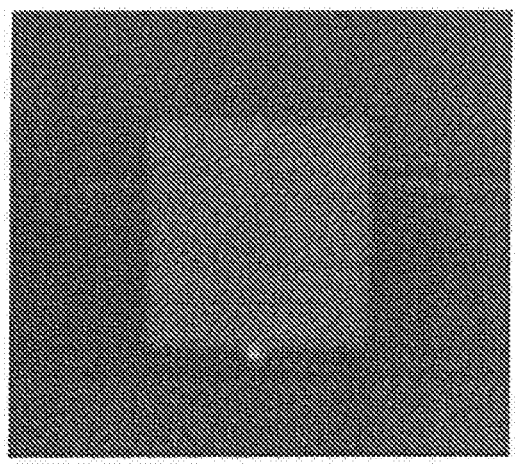
FIG. 18 shows an image of diffracted light projected on a screen, which was obtained when the diffracted light transmitted out of a diffractive optical element obtained in Example 5-2 was projected on a screen.
Figure 19:
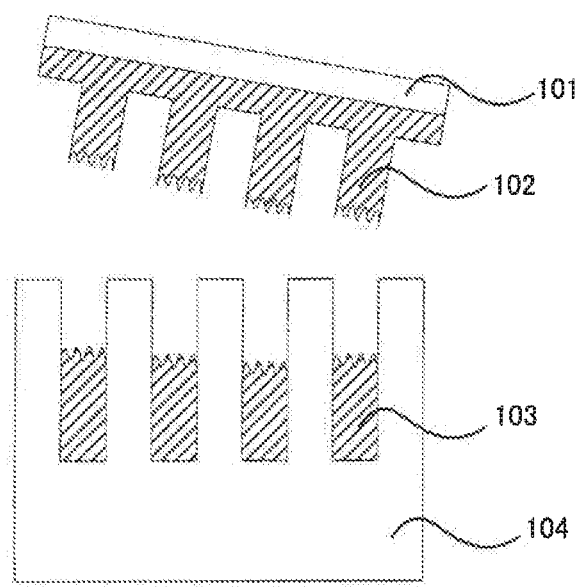
FIG. 19 is a schematic sectional view of an example of resin fracture in the production of a conventional diffractive optical element.
Figure 20:
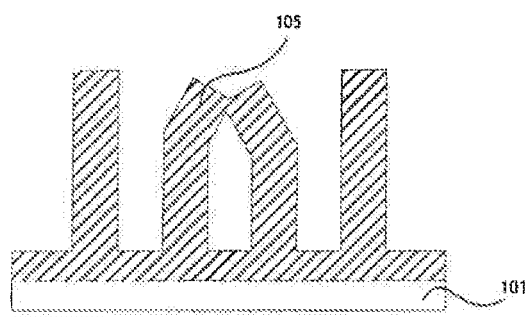
FIG. 20 is a schematic sectional view of an example of sticking caused in a conventional diffractive optical element.

A section of the diffractive optical element obtained in Example 5-2 was confirmed by SEM observation. As a result, it was found that a pattern in which the resin width and height at the narrowest step were 93 nm and 747 nm, respectively (aspect ratio: 8.0) was successfully molded without collapse or breaking off of projections. Light spreading was carried out by using a predetermined optical system. FIG. 18 shows an image of the diffracted light projected on a screen, which was obtained when the diffracted light transmitted out of the diffractive optical element obtained in Example 5-2 was projected on a screen. The projected image in a square shape is 1st-order light. A light diffusion shape as designed, was confirmed. A white point beneath the square is 0th-order light.

From the results of Examples 1 to 5, it is revealed that desired convexities which are prevented from being fractured or sticking and which have an aspect ratio of 2 or more, can be formed by using such an ionizing radiation curable resin composition that the storage modulus (E') at 25° C. of the cured ionizing radiation curable resin composition is $1 \times 10^8$ Pa or more and $5 \times 10^9$ Pa or less, and the ratio (tan δ (=E"/E')) of the loss modulus (E") at 25° C. of the cured ionizing radiation curable resin composition with respect to the storage modulus (E') thereof is 0.3 or less.

Example 6

Next, a simulation of a diffraction image of the 2-level diffractive optical element was carried out as follows.

The refractive index of the resin material forming the convexities, was set to 1.5. The line and space (L/S) were fixed at 1:1 (convexity width:concavity width). Then, the aspect ratio was changed by changing the width and height of the convexities.

Laser light with a wavelength of 800 nm or 980 nm was used as a light source. The following three angles were used as incident angles: 15°, 30° and 60°. Herein, an incident angle vertical to the surface of the diffractive optical element means 0°.

The results are shown in the following Tables 2 to 5. In the tables, the values of 0th-order light intensity and 1st-order light intensity are relative intensities when the intensity of incident light was regarded as 1.

TABLE 2-1

| Width of convexity (nm) | Depth (convexity height) (nm) | Aspect ratio | L/S | 0th-Light intensity | 1st-Light intensity |
|---|---|---|---|---|---|
| 320 | 640 | 2.00 | 1:1 | 0.575 | 0.375 |
| 320 | 680 | 2.13 | 1:1 | 0.544 | 0.414 |
| 320 | 720 | 2.25 | 1:1 | 0.515 | 0.448 |
| 320 | 760 | 2.38 | 1:1 | 0.487 | 0.475 |
| 320 | 800 | 2.50 | 1:1 | 0.458 | 0.496 |
| 320 | 840 | 2.63 | 1:1 | 0.430 | 0.513 |
| 320 | 880 | 2.75 | 1:1 | 0.402 | 0.531 |
| 320 | 920 | 2.88 | 1:1 | 0.376 | 0.554 |
| 320 | 960 | 3.00 | 1:1 | 0.352 | 0.582 |

Light wavelength of light source 800 nm, incident angle 30°

TABLE 2-2

| Width of convexity (nm) | Depth (convexity height) (nm) | Aspect ratio | L/S | 0th-Light intensity | 1st-Light intensity |
|---|---|---|---|---|---|
| 320 | 640 | 2.00 | 1:1 | 0.619 | 0.360 |
| 320 | 680 | 2.13 | 1:1 | 0.597 | 0.384 |
| 320 | 720 | 2.25 | 1:1 | 0.571 | 0.406 |
| 320 | 760 | 2.38 | 1:1 | 0.545 | 0.424 |
| 320 | 800 | 2.50 | 1:1 | 0.525 | 0.437 |
| 320 | 840 | 2.63 | 1:1 | 0.512 | 0.445 |
| 320 | 880 | 2.75 | 1:1 | 0.506 | 0.450 |
| 320 | 920 | 2.88 | 1:1 | 0.505 | 0.450 |
| 320 | 960 | 3.00 | 1:1 | 0.507 | 0.449 |

Light wavelength of light source 800 nm, incident angle 60°

TABLE 3-1

| Width of convexity (nm) | Depth (convexity height) (nm) | Aspect ratio | L/S | 0th-Light intensity | 1st-Light intensity |
|---|---|---|---|---|---|
| 400 | 640 | 1.6 | 1:1 | 0.572 | 0.338 |
| 400 | 680 | 1.7 | 1:1 | 0.546 | 0.369 |
| 400 | 720 | 1.8 | 1:1 | 0.518 | 0.396 |
| 400 | 760 | 1.9 | 1:1 | 0.488 | 0.418 |
| 400 | 800 | 2.0 | 1:1 | 0.456 | 0.437 |
| 400 | 840 | 2.1 | 1:1 | 0.426 | 0.456 |
| 400 | 880 | 2.2 | 1:1 | 0.398 | 0.476 |
| 400 | 920 | 2.3 | 1:1 | 0.376 | 0.500 |
| 400 | 960 | 2.4 | 1:1 | 0.360 | 0.524 |

Light wavelength of light source 800 nm, incident angle 15°

TABLE 3-2

| Width of convexity (nm) | Depth (convexity height) (nm) | Aspect ratio | L/S | 0th-Light intensity | 1st-Light intensity |
|---|---|---|---|---|---|
| 400 | 640 | 1.6 | 1:1 | 0.564 | 0.405 |
| 400 | 680 | 1.7 | 1:1 | 0.519 | 0.448 |
| 400 | 720 | 1.8 | 1:1 | 0.473 | 0.492 |
| 400 | 760 | 1.9 | 1:1 | 0.428 | 0.536 |
| 400 | 800 | 2.0 | 1:1 | 0.384 | 0.580 |
| 400 | 840 | 2.1 | 1:1 | 0.344 | 0.623 |
| 400 | 880 | 2.2 | 1:1 | 0.306 | 0.664 |
| 400 | 920 | 2.3 | 1:1 | 0.269 | 0.704 |
| 400 | 960 | 2.4 | 1:1 | 0.234 | 0.741 |

Light wavelength of light source 800 nm, incident angle 30°

TABLE 3-3

| Width of convexity (nm) | Depth (convexity height) (nm) | Aspect ratio | L/S | 0th-Light intensity | 1st-Light intensity |
|---|---|---|---|---|---|
| 400 | 640 | 1.6 | 1:1 | 0.539 | 0.224 |
| 400 | 680 | 1.7 | 1:1 | 0.537 | 0.244 |
| 400 | 720 | 1.8 | 1:1 | 0.520 | 0.268 |
| 400 | 760 | 1.9 | 1:1 | 0.492 | 0.291 |
| 400 | 800 | 2.0 | 1:1 | 0.468 | 0.310 |
| 400 | 840 | 2.1 | 1:1 | 0.455 | 0.324 |
| 400 | 880 | 2.2 | 1:1 | 0.450 | 0.335 |
| 400 | 920 | 2.3 | 1:1 | 0.453 | 0.343 |
| 400 | 960 | 2.4 | 1:1 | 0.461 | 0.350 |

Light wavelength of light source 800 nm, incident angle 60°

TABLE 4-1

| Width of convexity (nm) | Depth (convexity height) (nm) | Aspect ratio | L/S | 0th-Light intensity | 1st-Light intensity |
|---|---|---|---|---|---|
| 392 | 820 | 2.09 | 1:1 | 0.552 | 0.404 |
| 392 | 860 | 2.19 | 1:1 | 0.528 | 0.433 |
| 392 | 900 | 2.30 | 1:1 | 0.505 | 0.459 |
| 392 | 940 | 2.40 | 1:1 | 0.482 | 0.479 |
| 392 | 980 | 2.50 | 1:1 | 0.458 | 0.496 |
| 392 | 1020 | 2.60 | 1:1 | 0.435 | 0.510 |
| 392 | 1060 | 2.70 | 1:1 | 0.412 | 0.524 |
| 392 | 1100 | 2.81 | 1:1 | 0.390 | 0.541 |
| 392 | 1140 | 2.91 | 1:1 | 0.369 | 0.561 |

Light wavelength of light source 980 nm, incident angle 30°

TABLE 4-2

| Width of convexity (nm) | Depth (convexity height) (nm) | Aspect ratio | L/S | 0th-Light intensity | 1st-Light intensity |
|---|---|---|---|---|---|
| 392 | 820 | 2.09 | 1:1 | 0.603 | 0.378 |
| 392 | 860 | 2.19 | 1:1 | 0.583 | 0.397 |
| 392 | 900 | 2.30 | 1:1 | 0.561 | 0.413 |
| 392 | 940 | 2.40 | 1:1 | 0.541 | 0.426 |
| 392 | 980 | 2.50 | 1:1 | 0.525 | 0.437 |
| 392 | 1020 | 2.60 | 1:1 | 0.513 | 0.444 |
| 392 | 1060 | 2.70 | 1:1 | 0.507 | 0.449 |
| 392 | 1100 | 2.81 | 1:1 | 0.505 | 0.450 |
| 392 | 1140 | 2.91 | 1:1 | 0.505 | 0.450 |

Light wavelength of light source 980 nm, incident angle 60°

TABLE 5-1

| Width of convexity (nm) | Depth (convexity height) (nm) | Aspect ratio | L/S | 0th-Light intensity | 1st-Light intensity |
|---|---|---|---|---|---|
| 490 | 820 | 1.67 | 1:1 | 0.553 | 0.361 |
| 490 | 860 | 1.76 | 1:1 | 0.531 | 0.384 |
| 490 | 900 | 1.84 | 1:1 | 0.507 | 0.405 |
| 490 | 940 | 1.92 | 1:1 | 0.482 | 0.422 |
| 490 | 980 | 2.00 | 1:1 | 0.456 | 0.437 |
| 490 | 1020 | 2.08 | 1:1 | 0.431 | 0.453 |
| 490 | 1060 | 2.16 | 1:1 | 0.408 | 0.469 |
| 490 | 1100 | 2.24 | 1:1 | 0.387 | 0.487 |
| 490 | 1140 | 2.33 | 1:1 | 0.371 | 0.507 |

Light wavelength of light source 980 nm, incident angle 15°

TABLE 5-2

| Width of convexity (nm) | Depth (convexity height) (nm) | Aspect ratio | L/S | 0th-Light intensity | 1st-Light intensity |
|---|---|---|---|---|---|
| 490 | 820 | 1.67 | 1:1 | 0.531 | 0.436 |
| 490 | 860 | 1.76 | 1:1 | 0.494 | 0.472 |
| 490 | 900 | 1.84 | 1:1 | 0.457 | 0.508 |
| 490 | 940 | 1.92 | 1:1 | 0.420 | 0.544 |
| 490 | 980 | 2.00 | 1:1 | 0.384 | 0.580 |
| 490 | 1020 | 2.08 | 1:1 | 0.351 | 0.615 |
| 490 | 1060 | 2.16 | 1:1 | 0.319 | 0.649 |
| 490 | 1100 | 2.24 | 1:1 | 0.289 | 0.682 |
| 490 | 1140 | 2.33 | 1:1 | 0.260 | 0.714 |

Light wavelength of light source 980 nm, incident angle 30°

TABLE 5-3

| Width of convexity (nm) | Depth (convexity height) (nm) | Aspect ratio | L/S | 0th-Light intensity | 1st-Light intensity |
|---|---|---|---|---|---|
| 490 | 820 | 1.67 | 1:1 | 0.539 | 0.238 |
| 490 | 860 | 1.76 | 1:1 | 0.529 | 0.257 |
| 490 | 900 | 1.84 | 1:1 | 0.510 | 0.277 |
| 490 | 940 | 1.92 | 1:1 | 0.487 | 0.295 |
| 490 | 980 | 2.00 | 1:1 | 0.468 | 0.310 |
| 490 | 1020 | 2.08 | 1:1 | 0.456 | 0.322 |
| 490 | 1060 | 2.16 | 1:1 | 0.451 | 0.331 |
| 490 | 1100 | 2.24 | 1:1 | 0.451 | 0.339 |
| 490 | 1140 | 2.33 | 1:1 | 0.455 | 0.345 |

Light wavelength of light source 980 nm, incident angle 60°

[Conclusion]

From the results of Example 6, it is revealed that such a diffractive optical element that provides the 1st-order light with an intensity of 0.3 or more, can be designed by setting the aspect ratio of the convexities to 2 or more. As just described, according to the disclosed embodiments, the diffractive optical element being configured to provide desired diffracted light and being excellent in durability, can be produced by molding on the ionizing radiation curable resin composition. Also, the diffractive optical element of the disclosed embodiments can use infrared light with a wavelength of 900 nm or more.

REFERENCE SIGNS LIST

1. Diffractive layer
1A, 1B, 1C, 1D. Partial periodic structures (regions)
2. High refractive index portion
3. Low refractive index portion
4. Transparent substrate
5. Coating layer
6. Adhesive layer
7. Low refractive index resin layer
8A, 8B, 8C, 8D. Structures (regions) different in 4-level depth
9. Antireflection layer
10. Diffractive optical element
11. Substrate
12. Light emitting body
13. Light source
14. Glass plate
15. Adhesive layer
20. Light irradiation apparatus
21. Irradiation light
22. Screen
23. Irradiation regions irradiated by irradiation light 24. Irradiation region of light passed through a diffractive optical element
25. 0th-Order light
26a, 26b, 26c, 26d. 1st-Order light (diffracted light)
27. Position of 0th-Order light irradiation
31. Mold
32. Ionizing radiation curable resin composition
33. Transparent substrate
34. Pressure roller
35. Irradiation with ionizing radiation
36. Cured film
101. Substrate
102, 103. Fractured resin
104. Mold
105. Sticking resin

The invention claimed is:

1. A diffractive optical element configured to shape light from a light source,
   wherein the diffractive optical element is provided with a diffractive layer having a periodic structure comprising low refractive index portions and high refractive index portions;
   the high refractive index portions comprise a cured product of an ionizing radiation curable resin composition; and
   a storage modulus (E') at 25° C. of the cured product of the ionizing radiation curable resin composition is $1 \times 10^8$ Pa or more and $5 \times 10^9$ Pa or less.

2. The diffractive optical element according to claim 1, wherein a ratio (tan δ (=E"/E')) of a loss modulus (E") at 25° C. of the cured product of the ionizing radiation curable resin composition with respect to the storage modulus (E') is 0.3 or less.

3. The diffractive optical element according to claim 1, wherein, for a sectional shape of the diffractive layer, convexities forming the high refractive index portions include one having a height of 1000 nm or more.

4. The diffractive optical element according to claim 1, wherein, for the sectional shape of the diffractive layer, the convexities forming the high refractive index portions are in a stepped shape having two or more flat portions.

5. The diffractive optical element according to claim 4, wherein an aspect ratio of the convexities of the stepped shape is 3.5 or more.

6. The diffractive optical element according to claim 1, wherein the low refractive index portions are air.

7. The diffractive optical element according to claim 1, wherein the diffractive layer and a coating layer are disposed in this sequence on a transparent substrate.

8. The diffractive optical element according to claim 1, wherein an antireflection layer is disposed on an outermost surface.

9. The diffractive optical element according to claim 1, wherein the diffractive optical element diffracts infrared light with a wavelength of 780 nm or more.

10. A light irradiation apparatus comprising a light source and at least one diffractive optical element defined by claim 1.

11. The light irradiation apparatus according to claim 10, wherein the light source emits infrared light with a wavelength of 780 nm or more.

* * * * *